(12) United States Patent
Kanazawa et al.

(10) Patent No.: US 12,094,341 B2
(45) Date of Patent: Sep. 17, 2024

(54) RISK MANAGEMENT SYSTEM

(71) Applicant: HITACHI CONSTRUCTION MACHINERY CO., LTD., Tokyo (JP)

(72) Inventors: Akira Kanazawa, Tokyo (JP); Hiroyuki Yamada, Tokyo (JP); Shiho Izumi, Ibaraki (JP); Shinya Imura, Ibaraki (JP); Mariko Mizuochi, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 18/016,474

(22) PCT Filed: Jul. 27, 2021

(86) PCT No.: PCT/JP2021/027683
§ 371 (c)(1),
(2) Date: Jan. 17, 2023

(87) PCT Pub. No.: WO2022/025037
PCT Pub. Date: Feb. 3, 2022

(65) Prior Publication Data
US 2023/0316917 A1 Oct. 5, 2023

(30) Foreign Application Priority Data
Jul. 28, 2020 (JP) .................. 2020-127284

(51) Int. Cl.
*G08G 1/16* (2006.01)
(52) U.S. Cl.
CPC ...................... *G08G 1/16* (2013.01)
(58) Field of Classification Search
CPC .......... G08G 1/16; G08G 1/005; G08G 1/163; G08G 1/164; G08G 1/166; G06Q 10/0635;
(Continued)

(56) References Cited

U.S. PATENT DOCUMENTS

2013/0278440 A1 10/2013 Rubin et al.
2016/0063864 A1 3/2016 Ohsugi et al.
(Continued)

FOREIGN PATENT DOCUMENTS

JP 2006-188353 A1 7/2006
JP 2016-081087 A 5/2016
(Continued)

OTHER PUBLICATIONS

International Search Report of PCT/JP2021/027683 dated Sep. 7, 2021.
(Continued)

*Primary Examiner* — Omeed Alizada
(74) *Attorney, Agent, or Firm* — MATTINGLY & MALUR, PC

(57) ABSTRACT

The present invention intends to provide a risk management system that can accurately extract information necessary for analysis of a variety of accidents in which a machine is involved. For this purpose, a controller calculates a main risk that is the degree at which a main factor of an accident contributes to the occurrence of the accident on the basis of an evaluation value of the main factor, and calculates a subsidiary risk that is the degree at which a subsidiary factor of the accident contributes to the occurrence of the accident on the basis of an evaluation value of the subsidiary factor. Furthermore, the controller calculates, as the occurrence risk of the accident, an integrated risk that has a value equal to or larger than the main risk and increases or decreases at a degree lower than the degree of increase or decrease in the subsidiary risk, and, when the integrated risk has exceeded a predetermined threshold, causes a recording device to record parameters measured by measuring devices in a certain time period including a clock time at which the integrated risk has exceeded the predetermined threshold.

7 Claims, 22 Drawing Sheets

(58) Field of Classification Search
CPC .. G06Q 50/08; G05B 23/027; G05B 23/0272; G08B 21/182
See application file for complete search history.

(56) References Cited

U.S. PATENT DOCUMENTS

2019/0303463 A1* 10/2019 Catalano ................. G06F 16/22
2021/0264790 A1*  8/2021 Ganesan ................ G08G 1/166

FOREIGN PATENT DOCUMENTS

JP     2019-002242 A    1/2019
WO     2015/030240 A1   3/2015

OTHER PUBLICATIONS

International Preliminary Report on Patentability received in corresponding International Application No. PCT/JP2021/027683 dated Feb. 9, 2023.
Extended European Search Report received in corresponding European Application No. 21850477.7 dated Jul. 8, 2024.

* cited by examiner

| FACTORS OF ACCIDENTAL CONTACT | FACTOR EVALUATION PARAMETER | CLASSIFICATION |
|---|---|---|
| TA1: MACHINE EXCESSIVELY APPROACHES OBSTACLE | DISTANCE BETWEEN MACHINE AND OBSTACLE | MAIN FACTOR |
| TA2: MACHINE STARTS OPERATION IN INCORRECT DIRECTION | OPERATION DIRECTION OF MACHINE | MAIN FACTOR |
| TA3: EXISTENCE OF OBSTACLE IS OVERLOOKED | BLIND AREA OF MACHINE, WEATHER CONDITION, ILLUMINANCE | SUBSIDIARY FACTOR |

(b)

| FACTORS OF OVERTURNING ACCIDENT | FACTOR EVALUATION PARAMETER | CLASSIFICATION |
|---|---|---|
| TB1: MACHINE LOSES BALANCE | POSTURE OF MACHINE | MAIN FACTOR |
| TB2: EXCESSIVE LOAD IS APPLIED TO MACHINE | LOAD ON MACHINE | MAIN FACTOR |
| TB3: MACHINE SLIPS | INCLINATION OF TERRAIN, WEATHER CONDITION | SUBSIDIARY FACTOR |

(c)

| FACTORS OF FALL ACCIDENT | FACTOR EVALUATION PARAMETER | CLASSIFICATION |
|---|---|---|
| TC1: MACHINE EXCESSIVELY APPROACHES CLIFF | DISTANCE BETWEEN MACHINE AND CLIFF | MAIN FACTOR |
| TC2: MACHINE STARTS OPERATION IN INCORRECT DIRECTION | OPERATION DIRECTION OF MACHINE | MAIN FACTOR |
| TC3: MACHINE SLIPS | INCLINATION OF TERRAIN, WEATHER CONDITION | SUBSIDIARY FACTOR |

FIG. 5
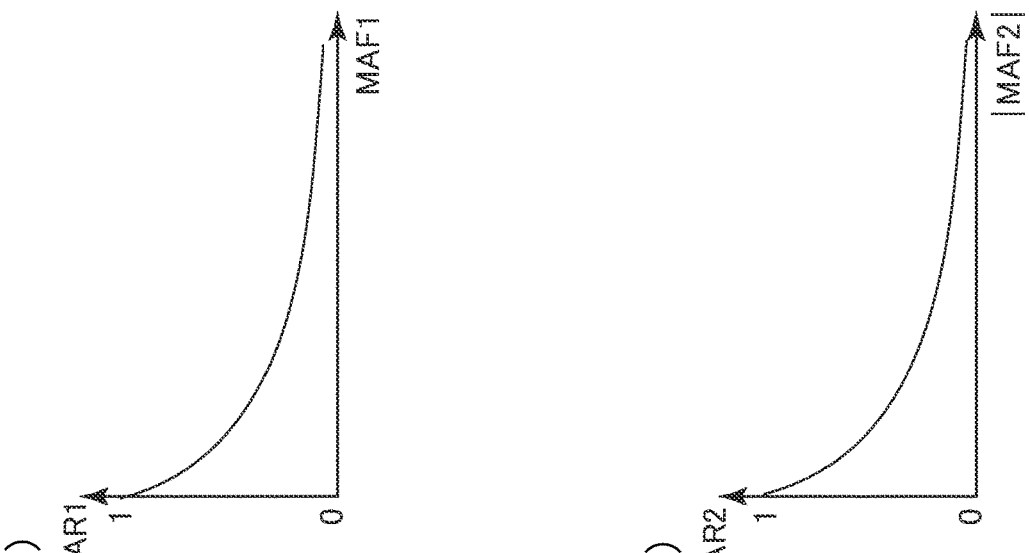
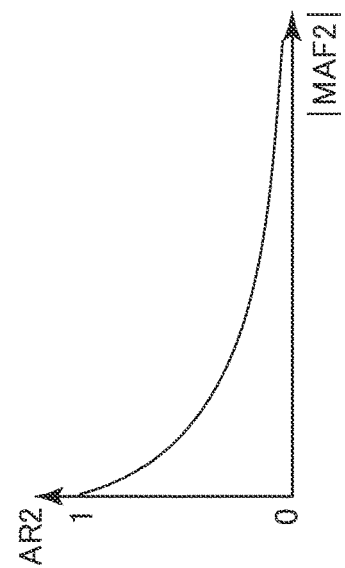
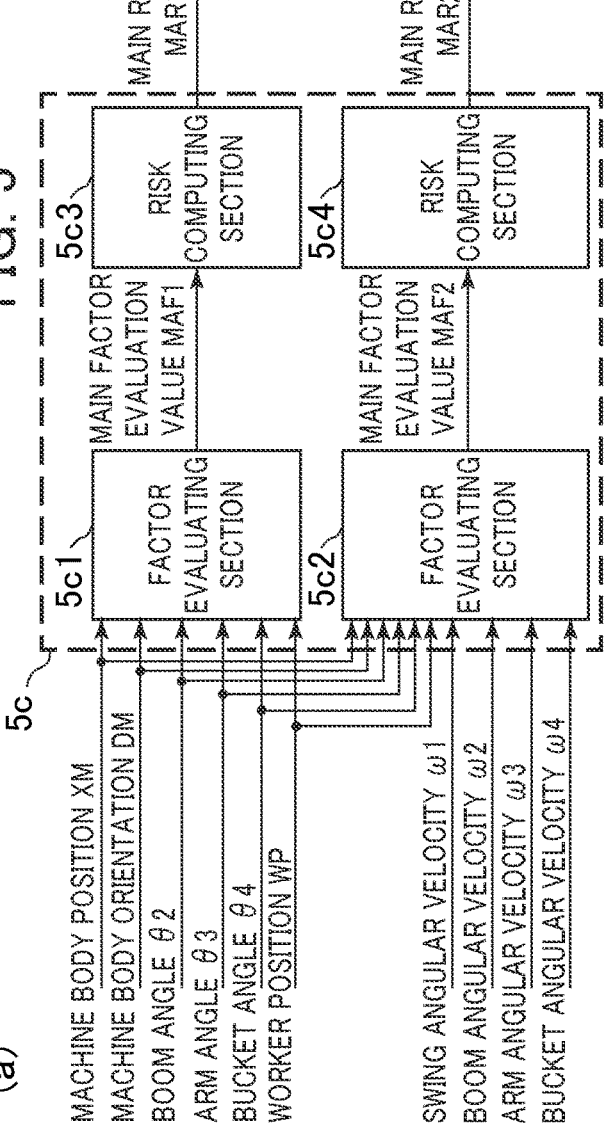
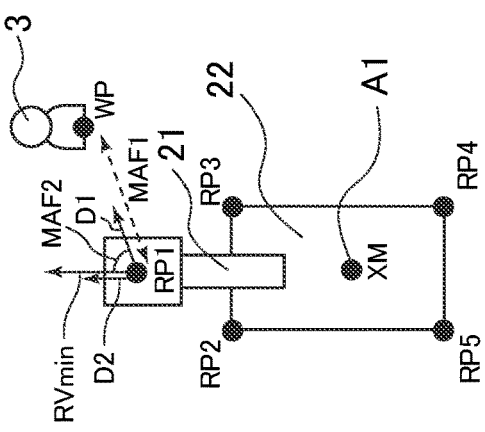

FIG. 6

(a)
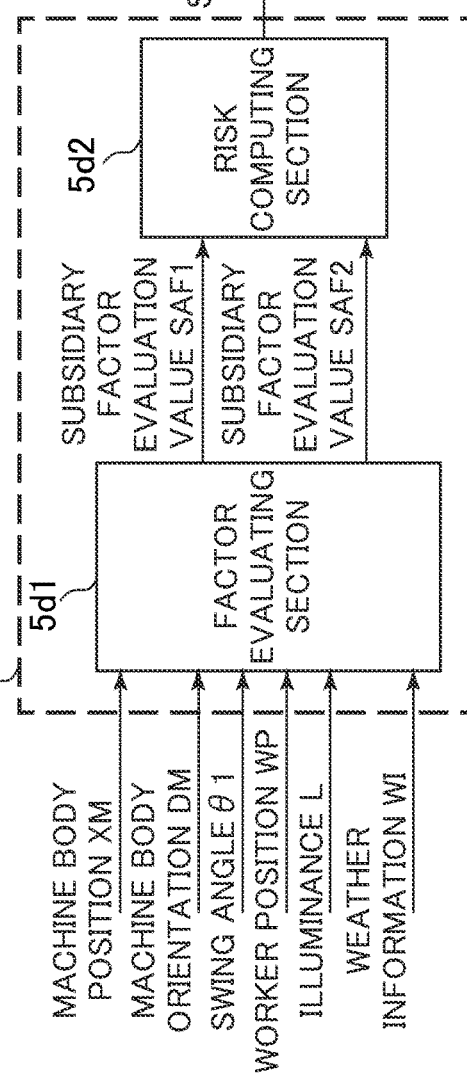

Inputs to FACTOR EVALUATING SECTION (5d1):
- MACHINE BODY POSITION XM
- MACHINE BODY ORIENTATION DM
- SWING ANGLE $\theta 1$
- WORKER POSITION WP
- ILLUMINANCE L
- WEATHER INFORMATION WI 5d → FACTOR EVALUATING SECTION (5d1) → SUBSIDIARY FACTOR EVALUATION VALUE SAF1, SUBSIDIARY FACTOR EVALUATION VALUE SAF2 → RISK COMPUTING SECTION (5d2) → SUBSIDIARY RISK SAR1

(b)
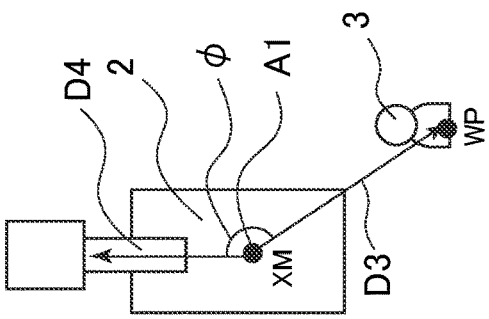

Labels: D4, 2, $\phi$, A1, 3, XM, D3, WP (c)

| SAF1 | SAF2 | SAR1 |
|------|------|------|
| 0    | 0    | 0    |
| 1    | 0    | 0.5  |
| 0    | 1    | 0.5  |
| 1    | 1    | 1    |

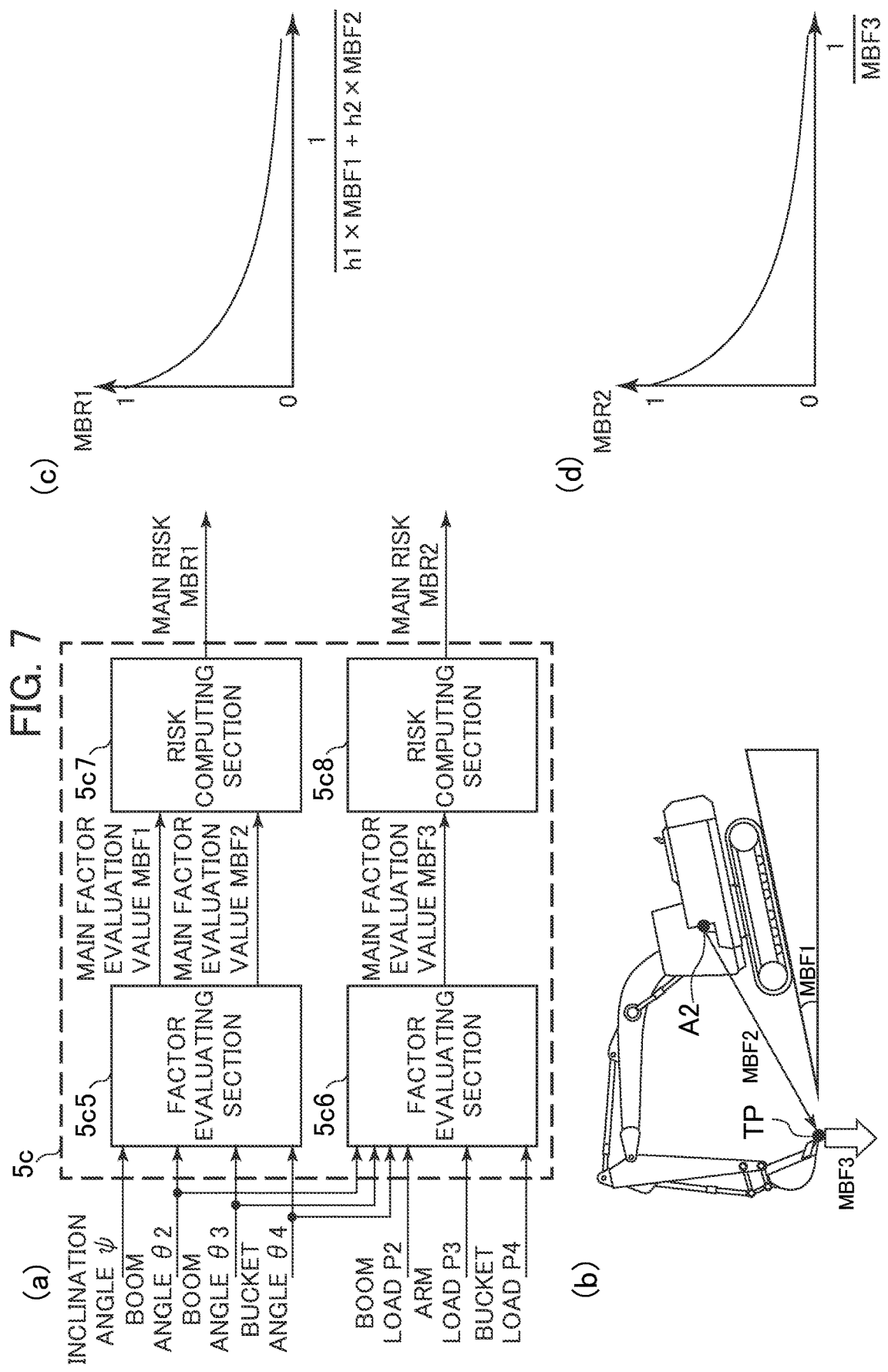

FIG. 14
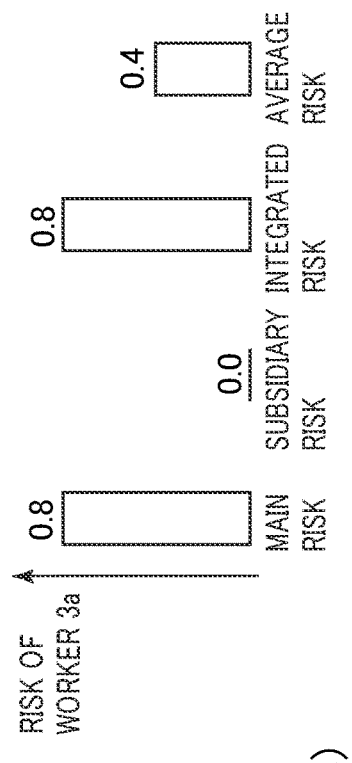 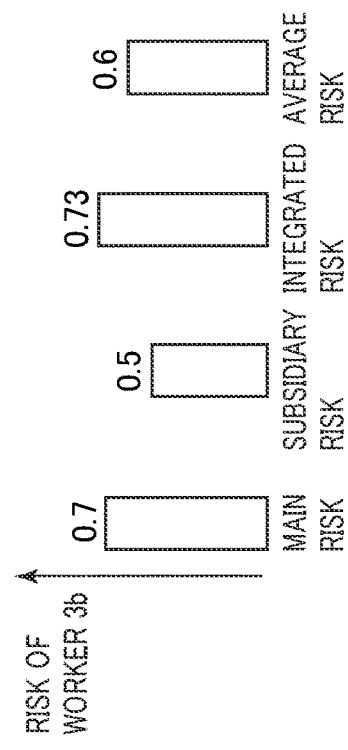 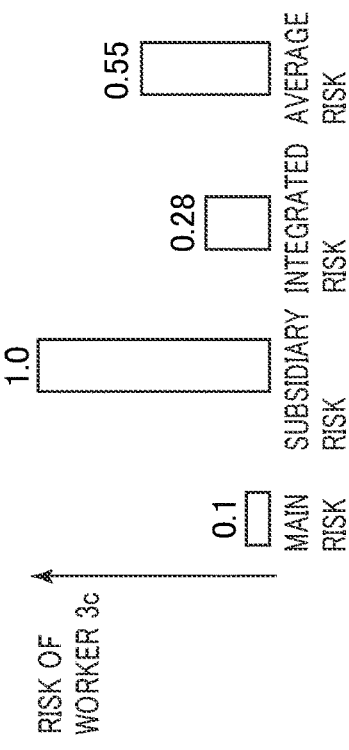
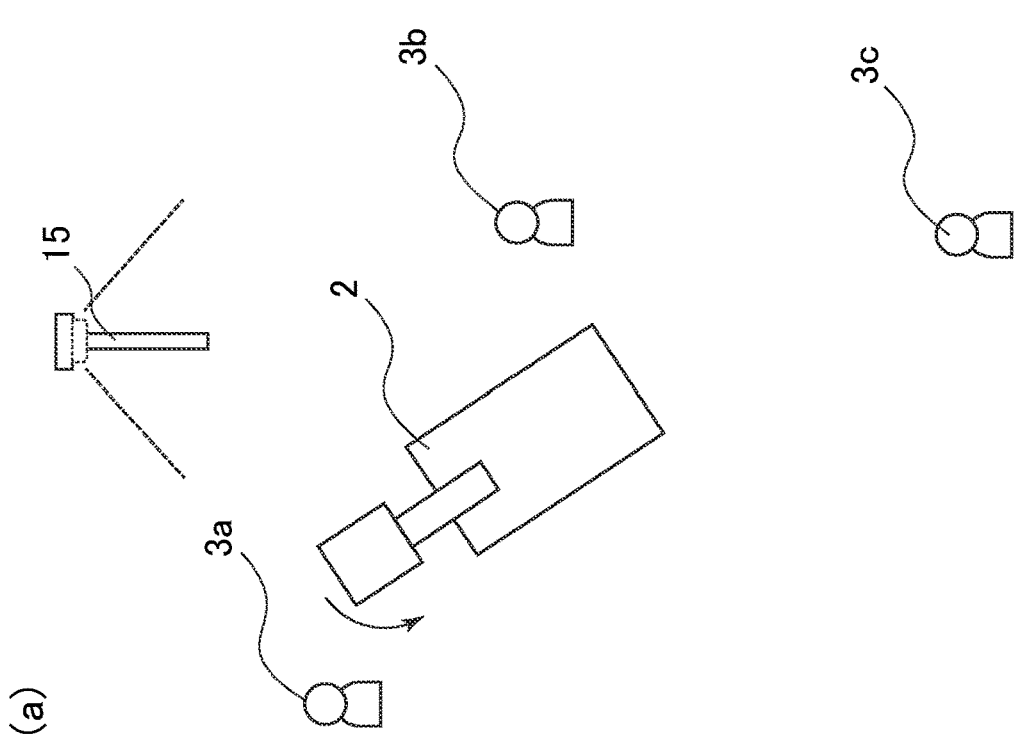

FIG. 15
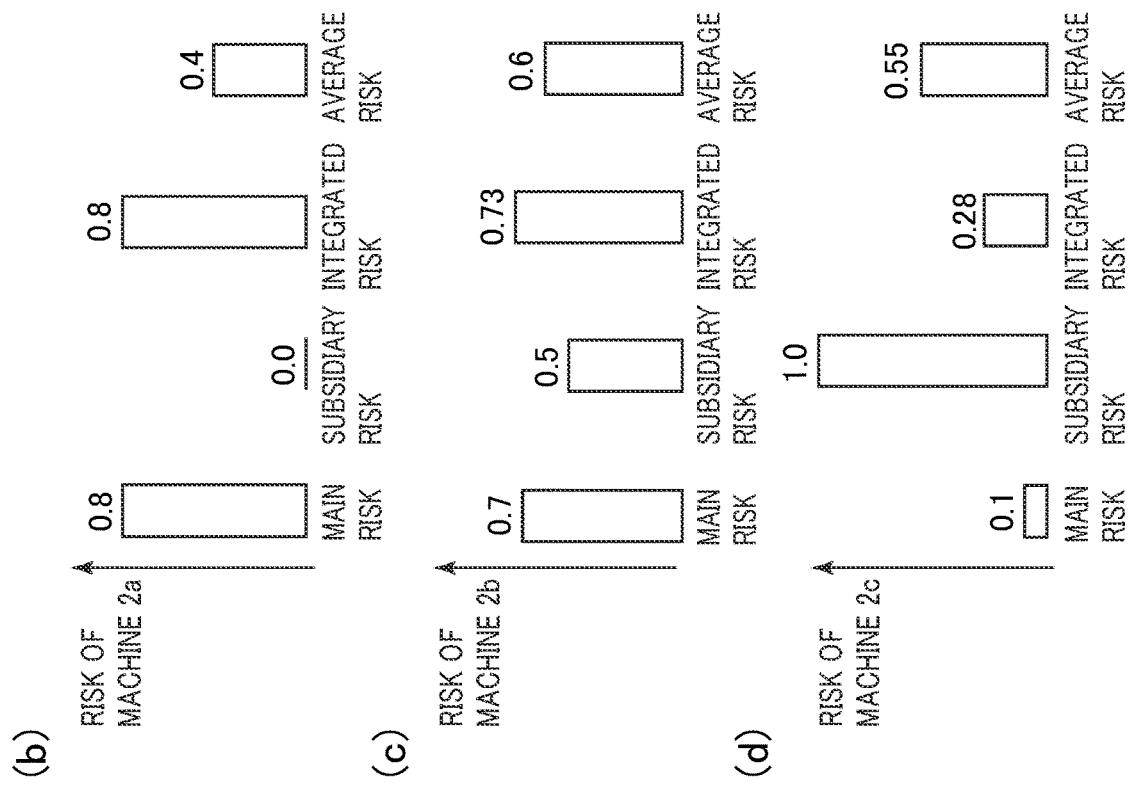
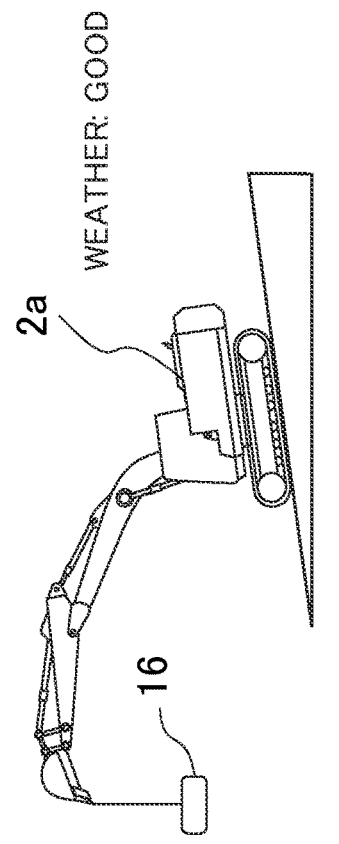
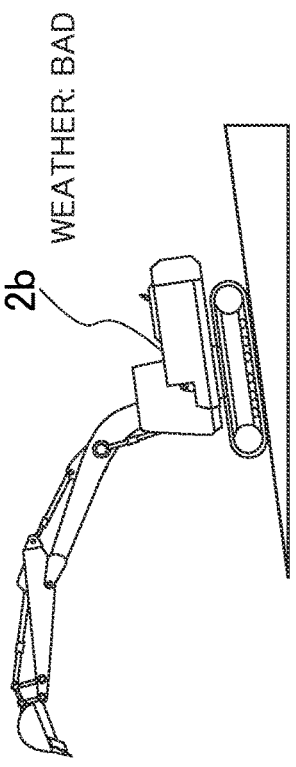
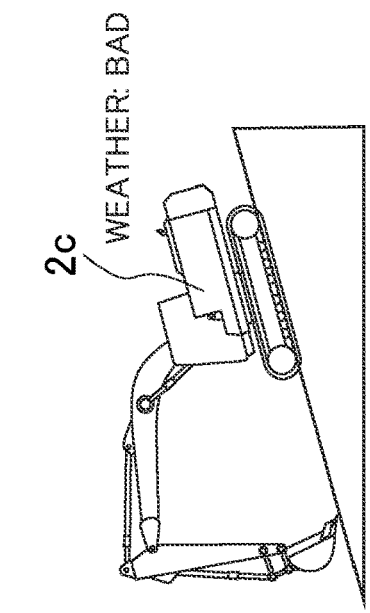

RISK MANAGEMENT SYSTEM

TECHNICAL FIELD

The present invention relates to a risk management system.

BACKGROUND ART

Due to promotion of i-Construction announced by the Ministry of Land, Infrastructure, Transport, and Tourism, practical use of a system that utilizes Information Communication Technology (ICT) and improves the productivity of a construction site has been advancing. On the other hand, the quantity of efforts relating to improvement in the safety is still small and the construction industry occupies nearly 30% in all types of industry regarding the number of industrial accident fatalities in Japan in the present conditions. Cases of fatal accidents in the construction industry have a variety such as getting sandwiched by or caught in a machine, contact with surroundings due to a fall or overturning of a machine, and throwing from an operator seat, and risk assessment and safety measures against potential hazardous factors at the site are indispensable.

In association with development of ICT utilization at construction sites, a system that aggregates pieces of information obtained from sensors attached to the environment, a worker, and a machine in the sites into a management server via a network has begun to be introduced to the sites. The introduction of such a system allows a manager of a construction site to grasp an accident that has occurred at the site or a near-miss event that is a precursor of an accident easily and in real time. However, the amount of information that the manager should analyze becomes more enormous as the number of sensors increases. Thus, specifying and selection of the information necessary for the analysis become difficult and lowering of the efficiency of analysis work is of concern. In addition, there is a limit on the capacity of a storage that saves information and thus it is difficult to save all collected pieces of information for a long period. Therefore, a technique for automatically extracting only the information necessary for risk analysis of accidents and near-miss events is required.

A technique as in patent document 1 has been disclosed as one example of a prior art in which a system automatically extracts and records pieces of information about timings when accidents and near-miss events have occurred on the basis of acquired sensor information. In patent document 1, an information processing device is shown that deems accidental contact between conveying vehicles or with a thing in surroundings as the subject and outputs the clock time, the position, the travelling velocity, and so forth at a timing when the possibility of contact of the conveying vehicle has become high.

PRIOR ART DOCUMENT

Patent Document

Patent Document 1: International Patent Publication WO 2015/030240

SUMMARY OF THE INVENTION

Problems to be Solved by the Invention

As accidents that occur at a construction site, in addition to accidental contact like that treated in patent document 1, a variety of accident forms such as an overturning accident due to balance loss of a machine body on a slope or the like and a fall accident from a high place like a cliff are envisaged. A variety of accidents including accidents other than contact need to be deemed as the subject for improvement in the safety of the construction site. However, determination of the degree of danger regarding accidents of overturning, fall, and so forth is difficult with only position information and velocity information differently from the accidental contact. Therefore, a variety of information including posture information such as the degree of extension/contraction of an excavator arm and the inclination of a machine body and terrain information about a slope, a cliff, and the weather needs to be utilized.

In the case of determining the occurrence of accidents and near-miss events by utilizing a variety of information, it becomes more difficult to properly consider occurrence factors of each accident and accurately compute the degree of danger as the amount of information increases. In particular, determination of the occurrence of near-miss events that are precursors of the occurrence of an accident is very difficult. Excessive information is determined as an accident when determination is lenient, whereas there is a possibility that the occurrence of a significant near-miss event is overlooked when determination is strict. Handling a variety of types of accidents by effectively utilizing a variety of information and determining the occurrence of a near-miss event more accurately are problems.

The present invention is made in view of the above-described problems and an object thereof is to provide a risk management system that can accurately extract information necessary for analysis of a variety of accidents in which a machine is involved.

Means for Solving the Problems

In order to achieve the above-described object, in the present invention, in a risk management system including measuring devices that measure parameters that represent a state of a machine and information on surroundings of the machine, a computer that calculates an occurrence risk of an accident in which the machine is involved on the basis of the parameters measured by the measuring devices, and a recording device capable of recording the parameters measured by the measuring devices, the computer is configured to calculate evaluation values of a main factor and a subsidiary factor of the accident on the basis of the parameters measured by the measuring devices, calculate a main risk that is a degree at which the main factor contributes to the occurrence of the accident on the basis of an evaluation value of the main factor, calculate a subsidiary risk that is a degree at which the subsidiary factor contributes to the occurrence of the accident on the basis of an evaluation value of the subsidiary factor, calculate, as the occurrence risk, an integrated risk that has a value equal to or larger than the main risk and increases or decreases at a degree lower than the degree of increase or decrease in the subsidiary risk, and, in a case where the integrated risk has exceeded a predetermined threshold, cause the recording device to record parameters measured by the measuring devices in a certain time period including a clock time at which the integrated risk has exceeded the predetermined threshold.

According to the present invention configured as above, the factors of the accident are classified into the main factor and the subsidiary factor, and the degree at which the main factor contributes to the occurrence of the accident (main risk) and the degree at which the subsidiary factor contributes to the occurrence of the accident (subsidiary risk) are calculated. Then, the occurrence risk (integrated risk) of the accident is calculated in the form in which the subsidiary risk is added on the main risk. This makes it possible to evaluate the occurrence risk of the accident in consideration of a variety of factors. Furthermore, the parameters measured when the integrated risk has become high are recorded in the recording device and therefore the extraction accuracy of information necessary for analysis of the accident improves.

Advantages of the Invention

According to the risk management system according to the present invention, it becomes possible to accurately extract information necessary for analysis of a variety of accidents in which the machine is involved.

BRIEF DESCRIPTION OF THE DRAWINGS

FIG. 4 is a diagram illustrating a classification example of main factors and subsidiary factors according to the first embodiment.

FIG. 5 is a diagram illustrating processing functions of a main risk computing section when accidental contact is envisaged according to the first embodiment.

FIG. 6 is a diagram illustrating processing functions of a subsidiary risk computing section when the accidental contact is envisaged according to the first embodiment.

FIG. 7 is a diagram illustrating processing functions of the main risk computing section when an overturning accident is envisaged according to the first embodiment.

FIG. 14 is a diagram illustrating an effect that the evaluation accuracy of the risk of accidental contact improves according to the first embodiment.

FIG. 15 is a diagram illustrating an effect that the evaluation accuracy of the risk of an overturning accident improves according to the first embodiment.

MODES FOR CARRYING OUT THE INVENTION

Embodiments of the present invention will be described below with use of drawings and so forth. The following description is what shows specific examples of the contents of the present invention, and the present invention is not limited by the description of them and various changes and corrections by those skilled in the art are possible in the range of technical ideas disclosed in the present specification. Furthermore, in all diagrams for explaining the present invention, what has the same function is given the same numeral and repeated description thereof is omitted in some cases.

First Embodiment

Figure 1:
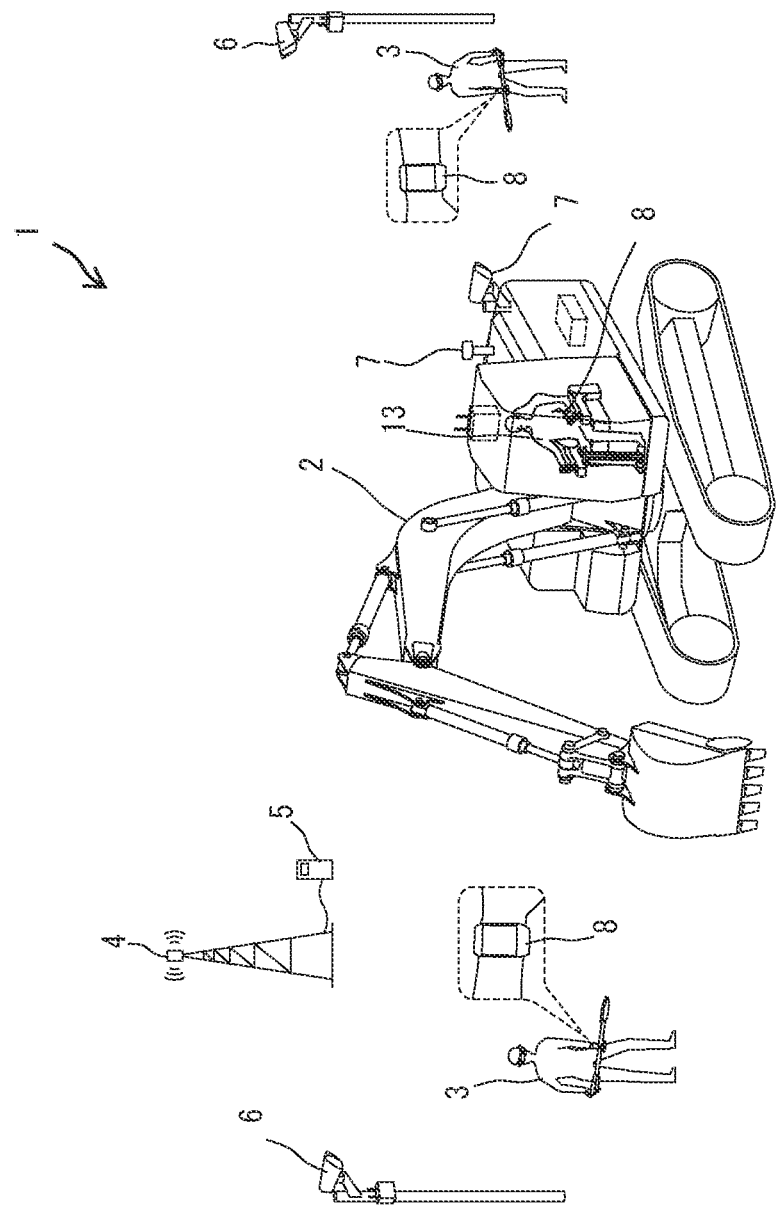
FIG. 1 is an overall diagram illustrating the configuration of a construction system according to a first embodiment.

FIG. 1 is an overall diagram illustrating the configuration of a construction system 1 according to a first embodiment. The construction system 1 is configured by a machine 2, workers 3, an operator 13, a communication facility 4, a server computer 5 as a controller, and so forth. In the machine 2, all machines that execute work, such as construction machine and conveying vehicle that operate at a construction site, are included. The machine 2 has communication equipment and a controller and has a function that allows automatic or semiautomatic operation. In the present embodiment, a hydraulic excavator is taken as an example and is illustrated as the machine 2. The workers 3 are persons who execute work in the construction site and execute assistance of work of the machine 2, peripheral work that does not have a direct relation with the machine 2, and so forth. The operator 13 is a person who rides in the machine 2 and operates the machine 2.

A wide variety of sensors are incorporated in the construction system 1 and are connected to the server computer 5 through the communication facility 4. The sensors are roughly classified into three types including an environment-installed sensor 6 installed in the environment, a machine-installed sensor 7 installed on the machine 2, and a worker-installed sensor 8 installed on the worker 3. As the environment-installed sensor 6, a camera that photographs surroundings, a sound sensor that measures noise and so forth, a weather sensor that measures weather information including the temperature, the humidity, and so forth, an illuminance sensor that measures the brightness of the work environment, and so forth are envisaged. As the machine-installed sensor 7, a camera that photographs surroundings, the Global Navigation Satellite System (GNSS) that measures the position and the orientation of the machine 2, an angle sensor that measures the inclination of the machine body, the angle of an arm, and so forth regarding the machine 2, a pressure sensor that measures the load applied on an actuator of the machine 2, and so forth are envisaged. As the worker-installed sensor 8, a wearable device in which the GNSS, a heart rate sensor, and so forth are mounted and that the worker 3 can put on the body directly is envisaged.

The communication facility 4 is a facility that allows all controllers and sensors in the construction site to connect to the same network and is configured by an access point of a wireless local area network (LAN), or the like. The server computer 5 is a computer connected to the communication network of the communication facility 4. The environment-installed sensor 6, the machine-installed sensor 7, and the worker-installed sensor 8 can be connected to the communication network provided by the communication facility 4 through communication equipment that each of them has, and can transmit measured information to the server computer 5 connected to the same network. Each of the numbers of the environment-installed sensors 6, the machine-installed sensors 7, and the worker-installed sensors 8 in the site is not limited to one, and suppose that plural sensors are optimally disposed in order to accurately grasp the situation in the site. Furthermore, suppose that the group of these all sensors is connected to the same communication network provided by the communication facility 4.

Figure 2:
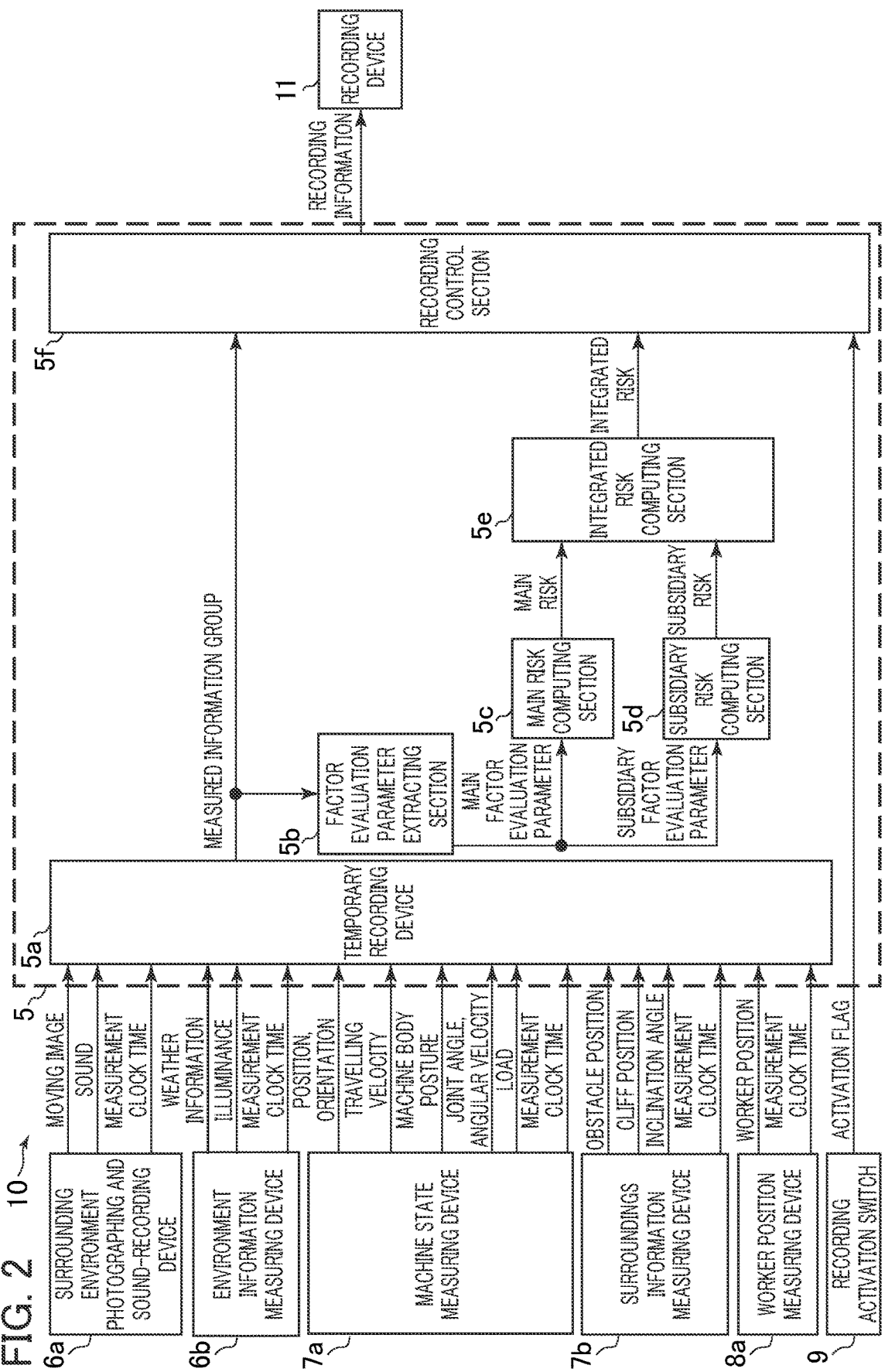
FIG. 2 is a functional block diagram illustrating processing functions of a risk management system according to the first embodiment.

FIG. 2 is a functional block diagram illustrating processing functions of a risk management system 10 according to the first embodiment. In the present embodiment, it is assumed that the risk management system 10 is constructed in the server computer 5, and suppose that information measured by each of the environment-installed sensor 6, the machine-installed sensor 7, and the worker-installed sensor 8 is inputted through the communication network provided by the communication facility 4. The environment-installed sensor 6 is composed of a surrounding environment photographing and sound-recording device 6a and an environment information measuring device 6b. Suppose that these sensors are installed on a pole or the like fixed at the site as illustrated in FIG. 1. A camera, a microphone, and so forth are envisaged as the surrounding environment photographing and sound-recording device 6a. The surrounding environment photographing and sound-recording device 6a is not what is used for evaluation of the risk of accident occurrence to be described later but information for the main purpose of grasping of events that have occurred in the site through later check of the information by the manager who treats recording information. Regarding the environment information measuring device 6b, weather information of rainy weather, dense fog, and so forth and illuminance information of the work environment are envisaged. In the present embodiment, it is assumed that these sensors are installed in the environment. However, a configuration in which they are installed on the machine 2 or the worker 3 may be employed.

Figure 3:
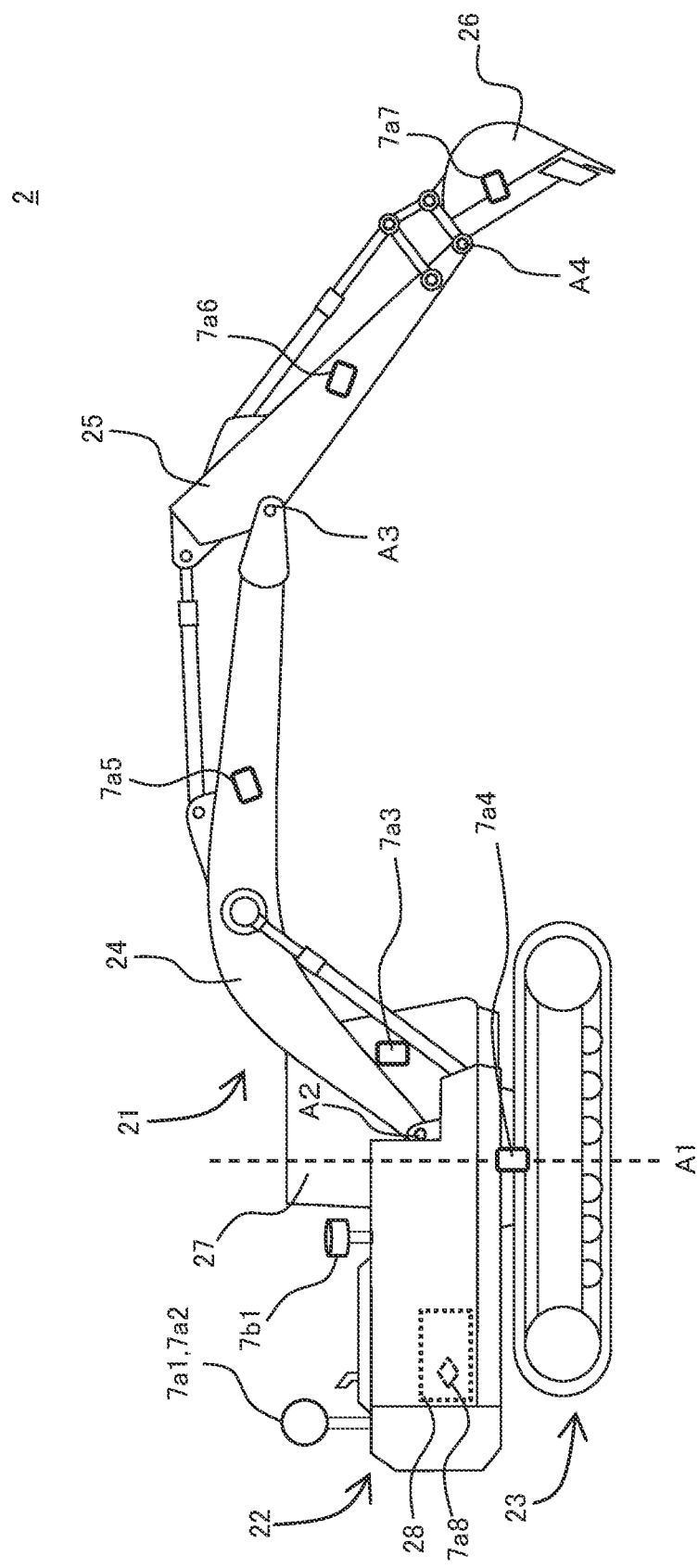
FIG. 3 is a diagram illustrating a mounting example of a machine-installed sensor that measures the state of a machine according to the first embodiment.

FIG. 3 is a diagram illustrating a mounting example of the machine-installed sensor 7 that measures the state of the machine 2. The machine-installed sensor 7 is composed of a machine state measuring device 7a and a surroundings information measuring device 7b and is installed on the machine 2. In the present embodiment, a hydraulic excavator is envisaged as the machine 2. The machine 2 includes an articulated front device (front work implement) 21 configured by joining plural driven members (boom 24, arm 25, and bucket (work tool) 26) that pivot and an upper swing structure 22 and a lower track structure 23 that configure a machine body. The upper swing structure 22 is disposed swingably relative to the lower track structure 23. Furthermore, the base end of the boom 24 of the front device 21 is pivotally supported by a front part of the upper swing structure 22, and one end of the arm 25 is pivotally supported by an end part (tip) different from the base end in the boom 24, and the bucket 26 is pivotally supported by the other end of the arm 25. The operator 13 who rides in the machine 2 rides in an operation room 27 and executes operation of the machine 2 by operation levers that are not illustrated.

Two GNSS antennas 7a1 and 7a2 are mounted on the upper swing structure 22, and a distance signal received from artificial satellites or the like is transmitted to a positioning device that is not illustrated, and the position and the orientation of the machine 2 in a global coordinate system defined in the construction site in advance are calculated. Moreover, the travelling velocity of the machine body is calculated by executing numerical differentiation of acquired position information. Furthermore, an inertial measurement unit 7a3 is attached to the upper swing structure 22 and the posture of the machine 2 in the roll-pitch directions and the angular velocity in the swing direction around a pivot axis A1 are calculated. In addition, the swing angle around the pivot axis A1 is calculated by a rotation angle measuring unit 7a4.

An inertial measurement unit 7a5 is attached to the boom 24 of the front device 21. An inertial measurement unit 7a6 is attached to the arm 25. An inertial measurement unit 7a7 is attached to the bucket 26. The inertial measurement units 7a5 to 7a7 each measure the acceleration and the angular velocity and calculate the angle and the rotational angular velocity of the boom 24 around a pivot axis A2, the angle and the rotation velocity of the arm 25 around a pivot axis A3, and the angle and the rotation velocity of the bucket 26 around a pivot axis A4, respectively, by a computing device that is not illustrated. Furthermore, a configuration may be employed in which angle sensors are installed near the pivot axes A1 to A3 of the boom 24, the arm 25, and the bucket 26, respectively, and the rotation angle is directly measured.

A control valve 28 for controlling operation of the upper swing structure 22, the lower track structure 23, the boom 24, the arm 25, and the bucket 26 of the machine 2 is mounted inside the upper swing structure 22. In the present specification, detailed description is omitted regarding a hydraulic control system that includes the control valve 28 and is not illustrated. Suppose that the hydraulic control system is equipped with a pressure measuring device group 7a8 that measures the pressure of a hydraulic fluid delivered from the control valve 28 to the respective actuators that operate the respective parts 22 to 26 of the machine 2 and the magnitude of the load applied to the respective actuators can be measured Moreover, a laser sensor 7b1 is attached to the upper swing structure 22 as the surroundings information measuring device 7b. Suppose that, by the laser sensor 7b1, the distance from an obstacle such as a wall or building, the distance from a boundary line (cliff) on the terrain across which the height difference greatly changes, the inclination of the surrounding terrain, and so forth can be computed. Here, the configuration may be made in such a manner that the inclination of surroundings is estimated from the posture of the machine 2 in the roll-pitch directions measured by the inertial measurement unit 7a3.

Referring back to FIG. 2, suppose that the workers 3 wear a watch-type wearable device like ones illustrated in FIG. 1 as the worker-installed sensor 8. Suppose that a worker position measuring device 8a in the present embodiment is the GNSS included in the wearable device and can measure the position of the worker 3 in the site in the same coordinate system as the machine 2. A configuration in which a receiver is attached to the worker 3 instead of the GNSS and the position of the worker 3 is measured by a beacon or the like may be employed. Furthermore, as a user interface, a recording activation switch 9 for determining whether to record information is included. The recording activation switch 9 outputs an activation flag for determining whether or not to record information stored in the server computer 5 in a recording device 11. The configuration may be made in such a manner that the recording device 11 is disposed at the external of the server computer 5 and recording information is outputted from the server computer 5 via the communication network of the communication facility 4. Pieces of information outputted by the measuring devices 6a, 6b, 7a, 7b, and 8a and the recording activation switch 9 are inputted to the server computer 5.

The risk management system 10 is composed of a temporary recording device 5a, a factor evaluation parameter extracting section 5b, a main risk computing section 5c, a subsidiary risk computing section 5d, an integrated risk computing section 5e, and a recording control section 5f. The temporary recording device 5a temporarily stores pieces of information measured by the respective measuring devices 6 to 8 different in the measurement cycle and organizes pieces of information measured at the same clock time as one set and thereafter outputs them to the factor evaluation parameter extracting section 5b and the recording control section 5f. Here, suppose that equipment that can measure the clock time, such as the GNSS, is included in the measuring devices 6 to 8 and each measuring device can output the measurement clock time on the same time axis.

The factor evaluation parameter extracting section 5b extracts parameters (factor evaluation parameters) for evaluating factors involved in the occurrence of an accident type deemed as the subject from measured information outputted by the temporary recording device 5a and separates the parameters into main factor evaluation parameters and subsidiary factor evaluation parameters to output them. In the present specification, the factor about which estimation of the degree of influence with respect to the occurrence of an accident deemed as the subject is easy is defined as the main factor. For example, the main factors are factors about which the occurrence condition of an accident phenomenon can be physically analyzed, such as the distance between the machine 2 and an obstacle and the posture of the machine 2. On the other hand, the factor about which estimation of the degree of influence with respect to the occurrence of an accident deemed as the subject is difficult is defined as the subsidiary factor. For example, the subsidiary factors are factors relating to a human error such as overlooking of an obstacle in surroundings by the operator 13 who rides in the machine 2 due to a blind area of the machine 2, the weather condition, or the like and factors about which it is difficult to analytically determine the occurrence condition from a measurement value, such as a slip that occurs depending on the inclination of the terrain, the weather condition, and so forth. In the present embodiment, the factor that can be directly evaluated based on measured information is deemed as the main factor, and the factor that can be evaluated only indirectly based on measured information is deemed as the subsidiary factor.

FIG. 4 (a) illustrates factors involved in the occurrence of accidental contact between the machine 2 and an obstacle including the worker 3, parameters for evaluating the respective factors (factor evaluation parameters), and classification of whether each factor is the factor that can be evaluated directly or analytically by the factor evaluation parameter (main factor) or is the other factor (subsidiary factor). The factor evaluation parameters are part of parameters measured by the measuring devices 6 to 8 directly or indirectly and are extracted from the temporary recording device 5a for each factor by the factor evaluation parameter extracting section 5b. Furthermore, classification of whether each factor is the main factor or the subsidiary factor is also executed by the factor evaluation parameter extracting section 5b.

As a first factor TA1 of the accidental contact, it is envisaged that the machine 2 excessively approaches an obstacle. The factor evaluation parameter of the factor TA1 is the distance between the machine 2 and the obstacle and the factor TA1 can be directly evaluated based on the distance between the machine 2 and the obstacle. Thus, the factor TAL is classified as the main factor.

As a second factor TA2, it is envisaged that the machine 2 starts operation in an incorrect direction due to erroneous operation by the operator 13 of the machine 2 or the like. The factor evaluation parameter of the factor TA2 is the operation direction of the machine 2 and the factor TA2 can be directly evaluated based on the operation direction of the machine 2. Thus, the factor TA2 is classified as the main factor.

As a third factor TA3, it is envisaged that the operator 13 of the machine 2 overlooks an obstacle existing around the machine 2. The factor TA3 readily occurs when the obstacle exists in a blind area of the operator 13 who rides in the machine 2 or when the field of view of the operator 13 is poor due to the deterioration of the weather condition such as rainy weather or dense fog or work in the dark such as in the night or in a tunnel. Thus, the blind area of the machine, the weather condition, and the illuminance are employed as the factor evaluation parameters of the factor TA3. However, it is difficult to directly evaluate the factor TA3 on the basis of the blind area of the machine, the weather condition, and the illuminance and thus the factor TA3 is classified as the subsidiary factor.

FIG. 4 (b) illustrates factors involved in the occurrence of an overturning accident of the machine 2, parameters for evaluating the respective factors (factor evaluation parameters), and classification of whether each factor is the factor that can be evaluated directly or analytically by the factor evaluation parameter (main factor) or is the other factor (subsidiary factor).

As a first factor TB1 of the overturning accident, it is envisaged that the machine 2 loses balance. The factor evaluation parameter of the factor TB1 is the posture of the machine 2 and the factor TB1 can be directly evaluated by the posture of the machine 2. Thus, the factor TB1 is classified as the main factor.

As a second factor TB2, it is envisaged that an excessive load is applied to the machine 2. The factor evaluation parameter of the factor TB2 is the load applied to the machine 2 and the factor TB3 can be directly evaluated by the load on the machine 2. Thus, the factor TB2 is classified as the main factor.

As a second factor TB3, it is envisaged that the lower track structure 23 of the machine 2 slips. The factor TB3 readily occurs when the inclination of the ground on which the machine 2 works is large or when the road surface condition is bad due to the deterioration of the weather condition. Thus, the inclination of the ground on which the machine 2 works and the weather condition are employed as the factor evaluation parameters of the factor TB3. However, it is difficult to directly evaluate the factor TB3 on the basis of the inclination of the ground and the weather condition and thus the factor TB3 is classified as the subsidiary factor.

FIG. 4 (c) illustrates factors involved in the occurrence of a fall accident of the machine 2, parameters for evaluating the respective factors (factor evaluation parameters), and classification of whether each factor is the factor that can be evaluated directly or analytically by the factor evaluation parameter (main factor) or is the other factor (subsidiary factor).

As a first factor TC1 of the fall accident, it is envisaged that the machine 2 excessively approaches a cliff. The factor evaluation parameter of the factor TC1 is the distance between the machine 2 and the cliff and the factor TC1 can be directly evaluated based on the distance between the machine 2 and the cliff. Thus, the factor TC1 is classified as the main factor.

As a second factor TC2, it is envisaged that the machine 2 starts operation in an incorrect direction due to erroneous operation by the operator 13 of the machine 2 or the like. The factor evaluation parameter of the factor TC2 is the operation direction of the machine 2 and the factor TC2 can be directly evaluated based on the operation direction of the machine 2. Thus, the factor TC2 is classified as the main factor.

As a third factor TC3, it is envisaged that the lower track structure 23 of the machine 2 slips. The factor TC3 readily occurs when the inclination of the ground on which the machine 2 works is large or when the road surface condition is bad due to the deterioration of the weather condition. Thus, the inclination of the ground on which the machine 2 works and the weather condition are employed as the factor evaluation parameters of the factor TC3. However, it is difficult to directly evaluate the factor TC3 on the basis of the inclination of the ground and the weather condition and thus the factor TB3 is classified as the subsidiary factor.

The main factors and the subsidiary factors about the respective accidents of contact, overturning, and fall are not limited to those illustrated in FIG. 4, and it is envisaged that the classification table is added or changed depending on addition of a measuring device or improvement in the performance of a measuring device. Furthermore, the accident types deemed as the subject by the present invention are not limited to the three types including contact, overturning, and fall, and a variety of accidents such as come-flying of earth and sand, a suspended load, or the like and heatstroke of the worker 3 attributed to increase in heat stress are deemed as the subject. Also regarding these accidents, the occurrence risk of the accident can be accurately calculated by defining the main factor and the subsidiary factor relating to the occurrence of the accident.

FIG. 5 is a diagram illustrating processing functions of the main risk computing section 5c corresponding to the accidental contact. As illustrated in FIG. 5 (a), the main risk computing section 5c is configured by the same number of factor evaluating sections and risk computing sections as the main factors envisaged. In the present embodiment, two main factors TA1 and TA2 are envisaged regarding the accidental contact. Therefore, the main risk computing section 5c is composed of two factor evaluating sections 5c1 and 5c2 and two risk computing sections 5c3 and 5c4.

FIG. 5 (b) illustrates a definition of geometric information used for computation by the factor evaluating sections 5c1 and 5c2 in the present embodiment. Regarding the machine 2, positions RP of plural reference points are defined in advance as values calculated from a machine body position XM, a machine body orientation $\theta 1$, a boom angle $\theta 2$, an arm angle $\theta 3$, and a bucket angle $\theta 4$ measured by the machine state measuring device 7a. In the present embodiment, the center position of the bucket 26 included in the front device 21 is defined as a reference point RP1 and four points at the four corners of the upper swing structure 22 are defined as reference points RP2 to RP5.

The reference point position RP1 is calculated as in the following expression (1) from the two-dimensional machine body position XM in the horizontal direction, the machine body orientation $\theta 1$ with respect to the vertical axis to the horizontal plane, the boom angle $\theta 2$, the arm angle $\theta 3$, and the bucket angle $\theta 4$.

[Equation 1]

$$RP1 = XM + f_1(\theta_1, \theta_2, \theta_3, \theta_4) \qquad (1)$$

Here, f1 is a function to obtain translational movement from the machine body position XM to the reference point RP1 with the machine body orientation $\theta 1$, the boom angle $\theta 2$, the arm angle $\theta 3$, and the bucket angle $\theta 4$ being variables. Here, the machine body position XM is defined to correspond with the position of the pivot axis A1 as viewed from the upper part of the machine body. Similarly, the reference point positions RP2 to RP5 are calculated as in the following expressions (2) to (5) on the basis of the machine body position XM and the machine body orientation $\theta 1$.

[Equation 2]

$$RP2 = XM + f_2(\theta_1) \qquad (2)$$

[Equation 3]

$$RP3 = XM + f_3(\theta_1) \qquad (3)$$

[Equation 4]

$$RP4 = XM + f_4(\theta_1) \qquad (4)$$

[Equation 5]

$$RP5 = XM + f_5(\theta_1) \qquad (5)$$

Here, f2 is a function to obtain translational movement from the machine body position XM to the reference point RP2 with the machine body orientation $\theta 1$ being a variable. f3 is a function to obtain translational movement from the machine body position XM to the reference point RP3 with the machine body orientation $\theta 1$ being a variable. £4 is a function to obtain translational movement from the machine body position XM to the reference point RP4 with the machine body orientation $\theta 1$ being a variable. f5 is a function to obtain translational movement from the machine body position XM to the reference point RP5 with the machine body orientation $\theta 1$ being a variable. In addition, reference point velocities RV1 to RV5 at the reference points RP1 to RP5, respectively, are decided based on a machine body velocity VM, the machine body orientation $\theta 1$, the boom angle $\theta 2$, the arm angle $\theta 3$, the bucket angle $\theta 4$, a swing angular velocity $\omega 1$, a boom angular velocity $\omega 2$, an arm angular velocity $\omega 3$, and a bucket angular velocity $\omega 4$ measured by the machine state measuring device 7a. The reference point velocity RV1 is calculated as in the following expression (6) from the two-dimensional machine body velocity VM in the horizontal direction, the machine body orientation $\theta 1$, the boom angle $\theta 2$, the arm angle $\theta 3$, the bucket angle θ4, the swing angular velocity ω1, the boom angular velocity ω2, the arm angular velocity ω3, and the bucket angular velocity ω4.

[Equation 6]

$$RV1=VM+g_1(\theta_1,\theta_2,\theta_3,\theta_4,\omega_1,\omega_2,\omega_3,\omega_4) \quad (6)$$

Here, g1 is a function to obtain the relative velocity with respect to the machine body velocity VM at the reference point RP1 with the machine body orientation θ1, the boom angle θ2, the arm angle θ3, the bucket angle θ4, the swing angular velocity ω1, the boom angular velocity ω2, the arm angular velocity ω3, and the bucket angular velocity ω4 being variables. Similarly, the reference point velocities RV2 to RV5 are calculated as in the following expressions (7) to (10) on the basis of the machine body velocity VM, the machine body orientation θ1, and the swing angular velocity ω1.

[Equation 7]

$$RV2=VM+g_2(\theta_1,\omega_1) \quad (7)$$

[Equation 8]

$$RV3=VM+g_3(\theta_1,\omega_1) \quad (8)$$

[Equation 9]

$$RV4=VM+g_4(\theta_1,\omega_1) \quad (9)$$

[Equation 10]

$$RV5=VM+g_5(\theta_1,\omega_1) \quad (10)$$

Here, g2 is a function to obtain the relative velocity with respect to the machine body velocity VM at the reference point RP2 with the machine body orientation θ1 and the swing angular velocity ω1 being variables. g3 is a function to obtain the relative velocity with respect to the machine body velocity VM at the reference point RP3 with the machine body orientation θ1 and the swing angular velocity ω1 being variables. g4 is a function to obtain the relative velocity with respect to the machine body velocity VM at the reference point RP4 with the machine body orientation θ1 and the swing angular velocity ω1 being variables. g5 is a function to obtain the relative velocity with respect to the machine body velocity VM at the reference point RP5 with the machine body orientation θ1 and the swing angular velocity ω1 being variables.

Regarding the worker 3, a worker position WP measured by the worker position measuring device 8a is defined as the position at which the worker 3 exists. The factor evaluating section 5c1 calculates a distance MAF1 between an obstacle and the machine 2 as an evaluation value of the main factor TA1. The factor evaluating section 5c2 calculates an angle MAF2 formed by the operation direction of the machine 2 and the obstacle existence direction as an evaluation value of the main factor TA2. As the distance MAF1 between the obstacle and the machine 2, the distance between a nearest reference point RPmin closest to the worker position WP in the reference points RP1 to RP5 and the worker position WP is employed, and the distance MAF1 is calculated as in the following expression (11).

[Equation 11]

$$MAF1=|RPmin-WP| \quad (11)$$

Here, suppose that the nearest reference point RPmin and the worker position WP are two-dimensional vectors. In FIG. 5 (b), the reference point RP1 becomes the nearest reference point RPmin.

As the angle MAF2 formed by the operation direction of the machine 2 and the obstacle existence direction, the angle formed by a direction vector D1 of the worker position WP as viewed from the nearest reference point RPmin and a direction vector D2 of a nearest operation velocity RVmin that is the operation velocity of the nearest reference point RPmin is employed, and the angle MAF2 is calculated as in the following expression (12).

[Equation 12]

$$MAF2=\cos^{-1}(D1 \cdot D2) \quad (12)$$

Here, suppose that the direction vectors D1 and D2 are both two-dimensional unit vectors.

The risk computing section 5c3 calculates risk (main risk MAR1) attributed to the influence of the main factor TA1 relating to the distance between the machine 2 and the obstacle. The main risk MAR1 is calculated from the following expression (13) with the main factor evaluation value MAF1 being an input.

[Equation 13]

$$MAR1=e^{-\lambda_1(MAF1)} \quad (13)$$

Here, λ1 is a coefficient that adjusts the degree of increase or decrease in the output with respect to increase or decrease in the input. FIG. 5 (c) illustrates the result of turning the risk computation by expression (13) to a graph. The main risk MAR1 is calculated to become higher as the distance MAF1 between the obstacle and the machine 2 becomes shorter, and the minimum value is 0 and the maximum value is 1.

The risk computing section 5c4 calculates risk (main risk MAR2) attributed to the influence of the main factor TA2 relating to the operation direction of the machine 2. The main risk MAR2 is calculated from the following expression (14) with the angle MAF2 formed by the operation direction of the machine 2 and the obstacle existence direction being an input.

[Equation 14]

$$MAR2=e^{-\lambda_2(|MAF2|)} \quad (14)$$

Here, λ2 is a coefficient that adjusts the degree of increase or decrease in the output with respect to increase or decrease in the input. FIG. 5 (d) illustrates the result of turning the risk computation by expression (14) to a graph. The main risk MAR2 is calculated to become higher as the absolute value of the angle MAF2 formed by the operation direction of the machine 2 and the obstacle existence direction becomes smaller, and the minimum value is 0 and the maximum value is 1.

FIG. 6 is a diagram illustrating processing functions of the subsidiary risk computing section 5d in the case in which the accidental contact is envisaged. As illustrated in FIG. 6 (a), the subsidiary risk computing section 5d is configured by the same number of factor evaluating sections and risk computing sections as the subsidiary factors envisaged. In the present embodiment, one subsidiary factor TA3 is envisaged regarding the accidental contact. Therefore, the subsidiary risk computing section 5d is composed of one factor evaluating section 5d1 and one risk computing section 5d2.

FIG. 6 (b) illustrates a definition of geometric information relating to the blind area of the machine 2 calculated by the factor evaluating section 5d1. A subsidiary factor evaluation value SAF1 is a flag of the result of determining whether the worker 3 exists in the blind area of the machine 2 on the basis of the machine body position XM, the machine body orientation θ1, and the worker position WP, and takes a value of 0 or 1. The subsidiary factor evaluation value SAF1 is calculated as in the following expression (15) on the basis of an angle φ formed by a direction vector D3 of the worker position WP as viewed from the machine body position XM and a direction vector D4 of the machine 2 computed from the machine body orientation θ1.

[Equation 15]

$$SAF1 = \begin{cases} 1 \ (\varphi < \varphi_{min}, \varphi_{max} < \varphi) \\ 0 \ (\varphi_{min} < \varphi < \varphi_{max}) \end{cases} \quad (15)$$

Here, φmin and φmax are thresholds for defining the range of the field of view of the operator 13 who rides in the machine 2 and fixed values defined in advance according to the nature of the machine 2 used are employed. That is, the case in which the angle φ departs from the range defined by φmin and φmax (SAF1=1) means that the possibility that the worker 3 is not visually recognized from the operator 13 of the machine 2 is high and therefore there is a danger.

A subsidiary factor evaluation value SAF2 is a flag for determining that it is difficult for the operator 13 who rides in the machine 2 to visually recognize surroundings depending on the condition of the weather and the illuminance measured by the surroundings information measuring device 7b. The subsidiary factor evaluation value SAF2 is outputted to become 0 when the weather condition and the illuminance condition are good and the field of view is favorable, and become 1 when the weather condition or the illuminance condition is bad and the field of view is poor.

Finally, the risk computing section 5d2 calculates risk (subsidiary risk) attributed to the influence of the subsidiary factor TA3 relating to a human error in which the operator 13 overlooks the existence of an obstacle. A subsidiary risk SAR1 is calculated as in the following expression (16) with the above-described two flags SAF1 and SAF2 being inputs.

[Equation 16]

$$SAR1 = \begin{cases} 1 & (SAF1 = 1 \text{ and } SAF2 = 1) \\ 0.5 & (SAF1 = 1 \text{ or } SAF2 = 1) \\ 0 & (SAF1 = 0 \text{ and } SAF2 = 0) \end{cases} \quad (16)$$

FIG. 6c is a table illustrating the result of the risk computation by expression (16). The subsidiary risk SAR1 is calculated to become 0 when the subsidiary factor evaluation values SAF1 and SAF2 are both on the safe side, and become 0.5 when one is on the dangerous side, and become 1 when both are on the dangerous side.

FIG. 7 is a diagram illustrating processing functions of the main risk computing section 5c in the case in which the overturning accident is envisaged. As illustrated in FIG. 7 (a), the main risk computing section 5c is configured by the same number of factor evaluating sections and risk computing sections as the main factors envisaged. In the present embodiment, two main factors TB1 and TB2 are envisaged regarding the overturning accident. Therefore, the main risk computing section 5c is composed of two factor evaluating sections 5c5 and 5c6 and two risk computing sections 5c7 and 5c8.

FIG. 7 (b) illustrates a definition of geometric information used for computation by the factor evaluating sections 5c5 and 5c6 in the present embodiment. In the factor evaluating section 5c5, first, a main factor evaluation value MBF1 is calculated as in the following expression (17) on the basis of an inclination angle $ of the terrain measured by the surroundings information measuring device 7b.

[Equation 17]

$$MBF1 = |\psi| \quad (17)$$

Next, a main factor evaluation value MBF2 is calculated as in the following expression (18) on the basis of the boom angle θ2, the arm angle θ3, and the bucket angle θ4 measured by the machine state measuring device 7a.

[Equation 18]

$$MBF2 = f_6(\theta_2, \theta_3, \theta_4) \quad (18)$$

Here, f6 is a function to obtain the distance between a base point A2 and a claw tip TP of the front device 21 of the machine 2 with the boom angle θ2, the arm angle θ3, and the bucket angle θ4 being variables.

In the factor evaluating section 5c5, a main factor evaluation value MBF3 is calculated as in the following expression (19) on the basis of the boom angle θ2, the arm angle θ3, the bucket angle θ4, a boom load P2, an arm load P3, and a bucket load P4 measured by the machine state measuring device 7a.

[Equation 19]

$$MBF3 = f_7(\theta_2, \theta_3, \theta_4, P_2, P_3, P_4) \quad (19)$$

Here, f7 is a function to obtain the force applied to the claw tip TP of the front device 21 of the machine 2 with the boom angle θ2, the arm angle θ3, the bucket angle θ4, the boom load P2, the arm load P3, and the bucket load P4 being variables.

The risk computing section 5c7 calculates risk (main risk MBR1) attributed to the influence of the main factor TB1 relating to the posture of the machine 2. The main risk MBR1 is calculated from the following expression (20) with the main factor evaluation values MBF1 and MBF2 being inputs.

[Equation 20]

$$MBR1 = e^{-\lambda_3 \left( \frac{1}{h1 \times MBF1 + h2 \times MBF2} \right)} \quad (20)$$

Here, λ3 is a coefficient that adjusts the degree of increase or decrease in the output with respect to increase or decrease in the input. h1 and h2 are scaling factors for adjusting the degree of influence of the main factor evaluation values MBF1 and MBF2, respectively. FIG. 7 (c) illustrates the result of turning the risk computation by expression (20) to a graph. The main risk MBR1 is calculated to become higher as the inclination MBF1 of the terrain becomes larger and the distance MBF2 from the base point A2 of the front device 21 to the claw tip TP becomes longer, and the minimum value is 0 and the maximum value is 1.

The risk computing section 5c8 calculates risk (main risk MBR2) attributed to the influence of the main factor TB2 relating to the load applied to the machine 2. The main risk MBR2 is calculated from the following expression (21) with the magnitude MBF3 of the force applied to the claw tip TP being an input.

[Equation 21]

$$MBR2 = e^{-\lambda_4 \left(\frac{1}{MBF3}\right)} \tag{21}$$

Here, λ4 is a coefficient that adjusts the degree of increase or decrease in the output with respect to increase or decrease in the input. FIG. 7 (d) illustrates the result of turning the risk computation by expression (21) to a graph. The main risk MBR2 is calculated to become higher as the force MBF3 applied to the claw tip TP becomes larger, and the minimum value is 0 and the maximum value is 1.

Figure 8:
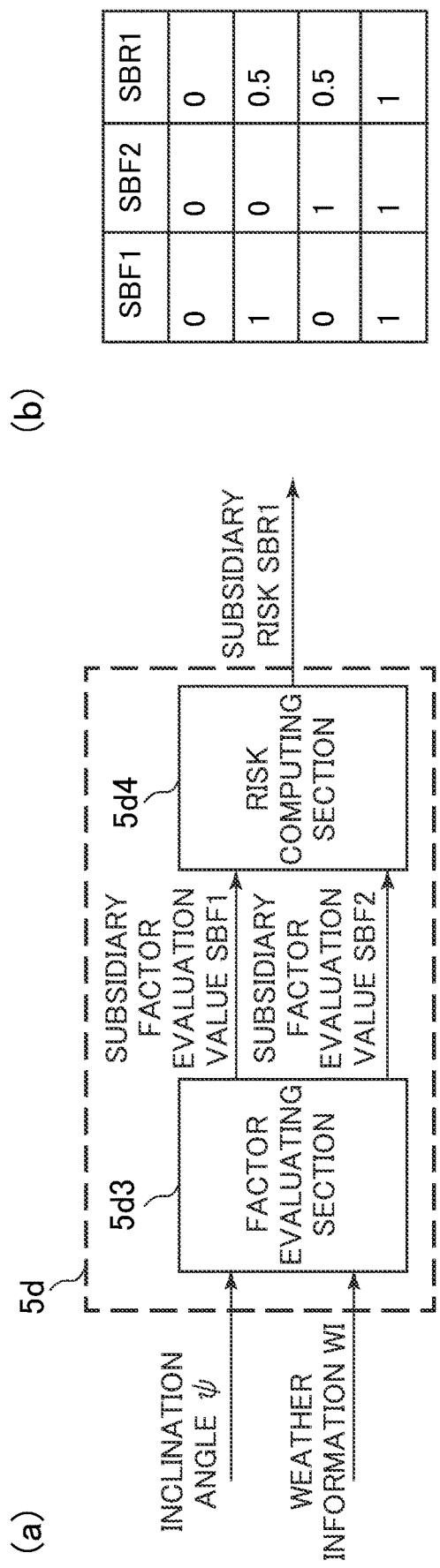
FIG. 8 is a diagram illustrating processing functions of the subsidiary risk computing section when the overturning accident is envisaged according to the first embodiment.

FIG. 8 is a diagram illustrating processing functions of the subsidiary risk computing section 5d in the case in which the overturning accident is envisaged. As illustrated in FIG. 8 (a), the subsidiary risk computing section 5d is configured by the same number of factor computing sections and risk computing sections as the subsidiary factors envisaged. In the present embodiment, one subsidiary factor TB3 is envisaged regarding the overturning accident. Therefore, the subsidiary risk computing section 5d is composed of one factor evaluating section 5d3 and one risk computing section 5d4.

A subsidiary factor evaluation value SBF1 is a flag of the result of determining whether the lower track structure 23 of the machine 2 is in a slippery situation on the basis of the inclination angle ψ of the terrain measured by the surroundings information measuring device 7b, and takes a value of 0 or 1. The subsidiary factor evaluation value SBF1 is calculated as in the following expression (22) on the basis of the inclination angle ψ.

[Equation 22]

$$SBF1 = \begin{cases} 1 & (\psi > \psi_{th}) \\ 0 & (\psi < \psi_{th}) \end{cases} \tag{22}$$

Here, ψth is a threshold for defining whether the lower track structure 23 of the machine 2 is in a slippery situation and a fixed value defined in advance according to the nature of the machine 2 used is employed.

A subsidiary factor evaluation value SBF2 is a flag for determining that the lower track structure 23 of the machine 2 is liable to slip by the weather condition measured by the surroundings information measuring device 7b. The subsidiary factor evaluation value SBF2 is outputted to become 0 when the weather condition is favorable, and become 1 when the weather condition is bad.

Finally, the risk computing section 5d4 calculates risk (subsidiary risk SBR1) attributed to the influence of the subsidiary factor TB3 relating to the slip of the machine 2. The subsidiary risk SBR1 is calculated as in the following expression (23) with the above-described two flags SBF1 and SBF2 being inputs.

[Equation 23]

$$SBR1 = \begin{cases} 1 & (SBF1 = 1 \text{ and } SBF2 = 1) \\ 0.5 & (SBF1 = 1 \text{ or } SBF2 = 1) \\ 0 & (SBF1 = 0 \text{ and } SBF2 = 0) \end{cases} \tag{23}$$

FIG. 8 (b) is a table illustrating the result of the risk computation by expression (23). The subsidiary risk SBR1 is calculated to become 0 when the subsidiary factor evaluation value SBF1 and the subsidiary factor evaluation value SBF2 are both on the safe side, and become 0.5 when one is on the dangerous side, and become 1 when both are on the dangerous side.

Figure 9:
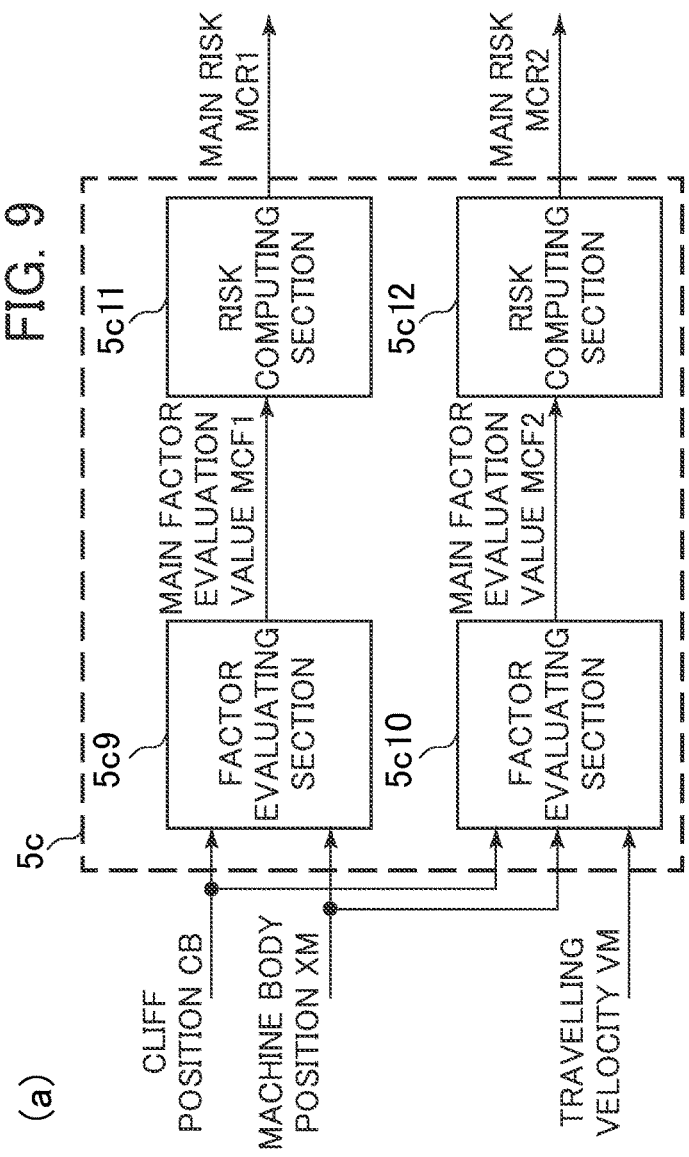
FIG. 9 is a diagram illustrating processing functions of the main risk computing section when a fall accident is envisaged according to the first embodiment.

FIG. 9 is a diagram illustrating processing functions of the main risk computing section 5c in the case in which the fall accident is envisaged. As illustrated in FIG. 9 (a), the main risk computing section 5c is configured by the same number of factor evaluating sections and risk computing sections as the main factors envisaged. In the present embodiment, two main factors TC1 and TC2 are envisaged regarding the fall accident. Therefore, the main risk computing section 5c is composed of two factor evaluating sections 5c9 and 5c10 and two risk computing sections 5c11 and 5c12.

FIG. 9 (b) illustrates a definition of geometric information used for computation by the factor evaluating sections 5c9 and 5c10 in the present embodiment. The factor evaluating section 5c9 calculates a distance MCF1 between a cliff CB and the machine 2 as an evaluation value of the main factor TC1. The factor evaluating section 5c2 calculates an angle MAF2 formed by the travelling velocity VM of the machine 2 and the existence direction of the cliff CB as an evaluation value of the main factor TC2. As the distance MCF1 between the cliff CB and the machine 2, the distance between a nearest point CBmin that exists on the straight line CB indicating the cliff and is closest to the machine body position XM of the machine 2 and the machine body position XM is employed, and the distance MCF1 is calculated as in the following expression (24).

[Equation 24]

$$MCF1 = |CBmin - XM| \tag{24}$$

Here, suppose that the nearest point CBmin and the machine body position XM are two-dimensional vectors.

As the angle MCF2 formed by the operation direction of the machine 2 and the cliff existence direction, the angle formed by the direction vector D3 of the nearest point CBmin as viewed from the machine body position XM and the direction vector D4 of the travelling velocity VM is employed, and the angle MCF2 is calculated as in the following expression (25).

[Equation 25]

$$MCF2 = \cos^{-1}(D3 \cdot D4) \tag{25}$$

Here, suppose that the direction vectors D3 and D4 are both two-dimensional unit vectors.

The risk computing section 5c11 calculates risk (main risk MCR1) attributed to the influence of the main factor TC1 relating to the distance MCF1 between the machine 2 and the cliff CB. The main risk MCR1 is calculated from the following expression (26) with the main factor evaluation value MCF1 being an input.

[Equation 26]

$$MCR1 = e^{-\lambda_5(MCF1)} \tag{26}$$

Here, λ5 is a coefficient that adjusts the degree of increase or decrease in the output with respect to increase or decrease in the input. FIG. 9 (c) illustrates the result of turning the risk computation by expression (26) to a graph. The main risk MCR1 is calculated to become higher as the distance MCF1 between the machine 2 and the cliff CB becomes shorter, and the minimum value is 0 and the maximum value is 1.

The risk computing section 5c12 calculates risk (main risk MCR2) attributed to the influence of the main factor TC2 relating to the travelling direction of the machine 2. The main risk MCR2 is calculated from the following expression

(27) with the angle MCF2 formed by the travelling direction of the machine 2 and the cliff existence direction being an input.

[Equation 27]

$$MCR2 = e^{-\lambda_6(|MCF2|)} \tag{27}$$

Here, $\lambda_6$ is a coefficient that adjusts the degree of increase or decrease in the output with respect to increase or decrease in the input. FIG. 9 (d) illustrates the result of turning the risk computation by expression (27) to a graph. The main risk MCR2 is calculated to become higher as the absolute value of the angle MCF2 formed by the travelling direction of the machine 2 and the cliff existence direction becomes smaller, and the minimum value is 0 and the maximum value is 1.

Figure 10:
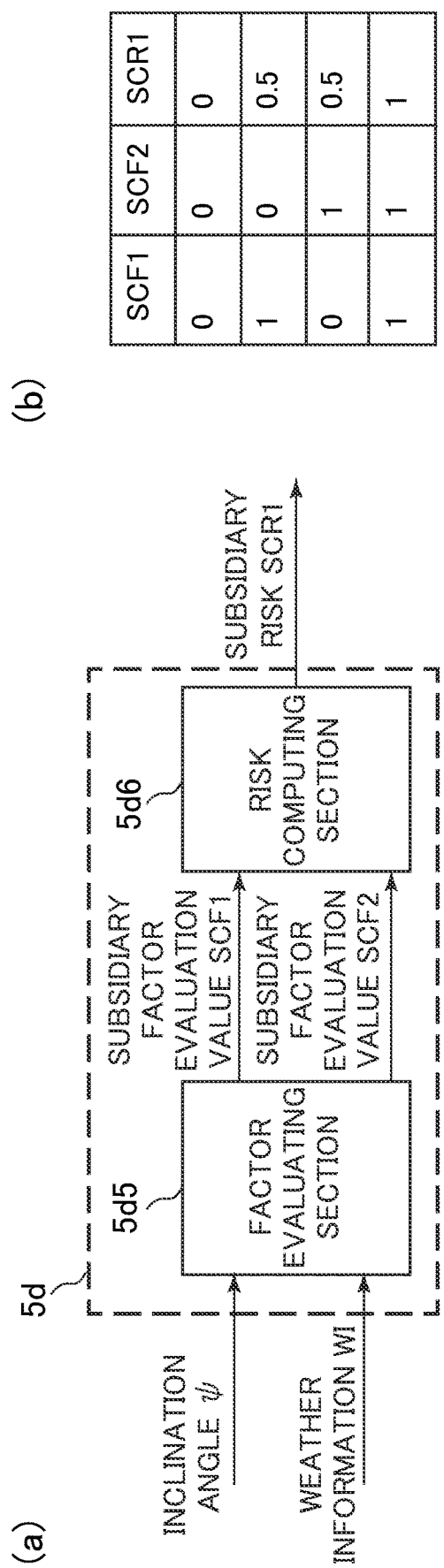
FIG. 10 is a diagram illustrating processing functions of the subsidiary risk computing section when the fall accident is envisaged according to the first embodiment.

FIG. 10 is a diagram illustrating processing functions of the subsidiary risk computing section 5d in the case in which the fall accident is envisaged. As illustrated in FIG. 10 (a), the subsidiary risk computing section 5d is configured by the same number of factor evaluating sections and risk computing sections as the subsidiary factors envisaged. In the present embodiment, one subsidiary factor TC3 is envisaged regarding the overturning accident. Therefore, the subsidiary risk computing section 5d is composed of one factor evaluating section 5d5 and one risk computing section 5d6. The calculation method of a subsidiary factor evaluation value SCF1 by the factor evaluating section 5d5 and the calculation method of a subsidiary risk SCR1 by the risk computing section 5d6 are similar to those of the factor evaluating section 5d3 and the risk computing section 5d4 illustrated in FIG. 8 and therefore detailed description thereof is omitted. Finally, the subsidiary risk SCR1 is calculated in accordance with a table illustrated in FIG. 10 (b) and the subsidiary risk SCR1 takes a value of any of 0, 0.5, and 1.

Figure 11:
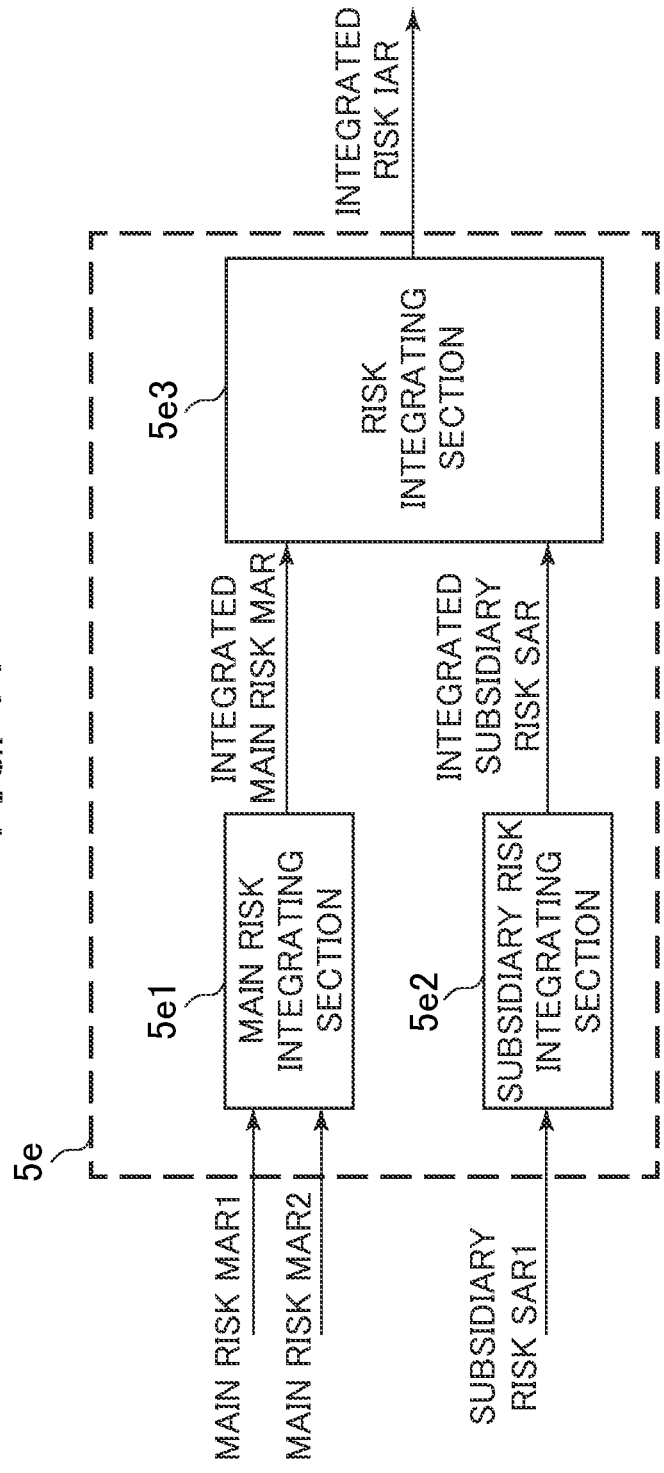
FIG. 11 is a diagram illustrating processing functions of an integrated risk computing section according to the first embodiment.

FIG. 11 is a diagram illustrating processing functions of the integrated risk computing section 5e. In FIG. 11, computation blocks in the case in which the accidental contact is envisaged in accordance with the classification table illustrated in FIG. 4 are illustrated. The integrated risk computing section 5e integrates the main risks MAR1 and MAR2 outputted by the main risk computing section 5c and the subsidiary risk SAR1 outputted by the subsidiary risk computing section and outputs an integrated risk IAR. The integrated risk computing section 5e is composed of a main risk integrating section 5e1, a subsidiary risk integrating section 5e2, and a risk integrating section 5e3.

The main risk integrating section 5e1 integrates the main risks outputted by the main risk computing section 5c as in the following expression (28) and outputs an integrated main risk MAR.

[Equation 28]

$$MAR = \sum_{i=1}^{N_m} (cm_i \times MAR_i) \tag{28}$$

Here, Nm is the total number of main risks to be integrated and Nm=2 holds in the present embodiment. cmi is a weighting factor for the i-th main risk MARi and is decided in advance in such a manner that taking the sum of cmi provides 1.

Similarly, the subsidiary risk integrating section 5e2 integrates the subsidiary risks outputted by the subsidiary risk computing section 5d as in the following expression (29) and outputs an integrated subsidiary risk SAR.

[Equation 29]

$$SAR = \sum_{i=1}^{N_s} (cs_i \times SAR_i) \tag{29}$$

Here, Ns is the total number of subsidiary risks to be integrated and Ns=1 holds in the present embodiment. csi is a weighting factor for the i-th subsidiary risk SARi and is decided in advance in such a manner that taking the sum of csi provides 1.

Finally, the risk integrating section 5e3 integrates the integrated main risk MAR and the integrated subsidiary risk SAR as in the following expression (30) to calculate the integrated risk IAR.

[Equation 30]

$$IAR = 1 - (1 - MAR) \times (1 - s_a \times SAR) \tag{30}$$

Here, sa is a weighting factor that decides the influence of the subsidiary risk SAR and is decided in advance as a constant of at least 0 and at most 1. By setting the value of the weighting factor sa smaller when estimation of the influence of the subsidiary factor envisaged is more difficult and inaccurate, the influence of lowering the reliability of the computation result of the risk by the estimation difficulty of the subsidiary factor can be prevented. The computation methods of integrated risks IBR and ICR in the cases in which the overturning and fall accidents are envisaged are also similar to that of the case of the integrated risk IAR of the accidental contact and therefore detailed description thereof is omitted.

Referring back to FIG. 2, when the flag outputted by the recording activation switch 9 is valid, the recording control section 5f extracts data of a clock time at which any of the integrated risks IAR, IBR, and ICR outputted by the integrated risk computing section 5e has become high from a measured information group temporarily recorded in the temporary recording device 5a and stores the data in the recording device 11. When any of the integrated risks IAR, IBR, and ICR has exceeded a threshold TH set in advance, the recording control section 5f generates a recording trigger TG and decides a recording range RA indicating the clock time range of the information to be recorded.

Figure 12:
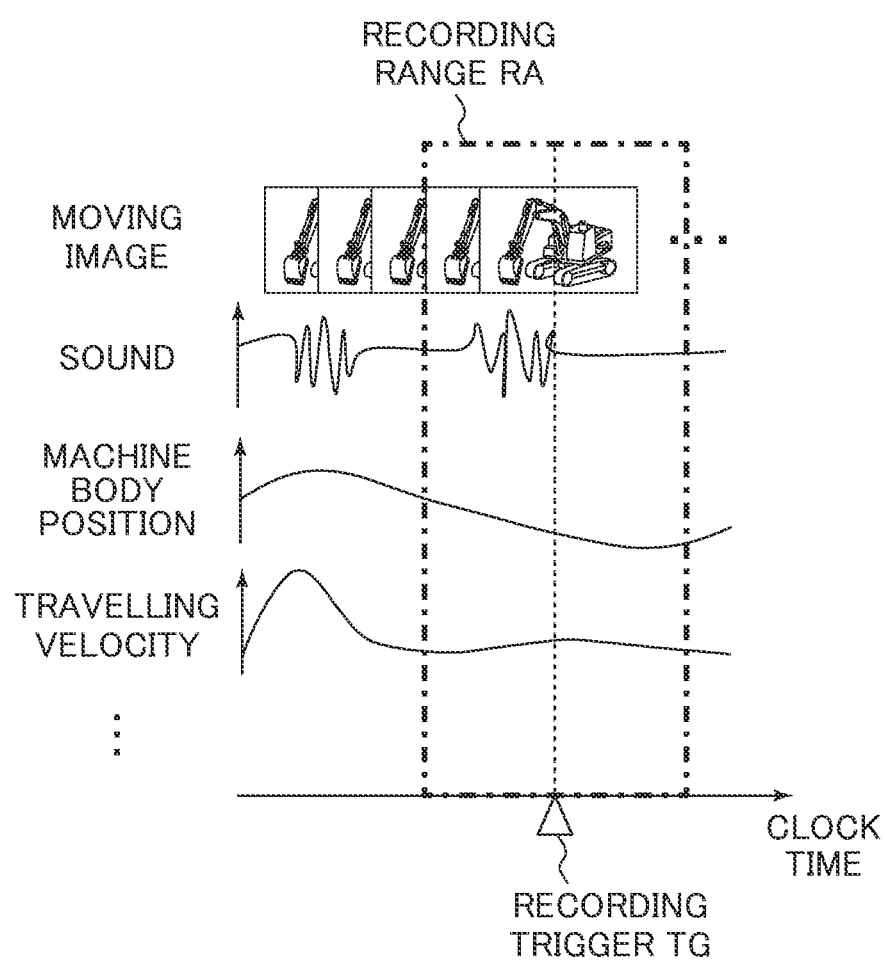
FIG. 12 is a diagram illustrating one example of the output result of a recording control section according to the first embodiment.

FIG. 12 is a diagram illustrating one example of the output result of the recording control section 5f. The measured information group outputted by the temporary recording device 5a is represented as time-series information associated with the measurement clock time of each piece of information outputted by the measuring devices 6 to 8. When the measured information group is synchronized in the time-series direction, the certain recording range RA around the clock time at which the recording trigger TG has occurred is saved in the recording device 11 as recording information. The recording range RA is a value set in advance. When the range is larger, the possibility of lack of information having a significant influence on the occurrence of an accident becomes lower but the amount of information recorded in the recording device 11 becomes more enormous. On the other hand, when the range is smaller, the information recorded in the recording device 11 can be reduced to a larger extent but the possibility of lack of information having a significant influence on the occurrence of an accident becomes higher.

Figure 13:
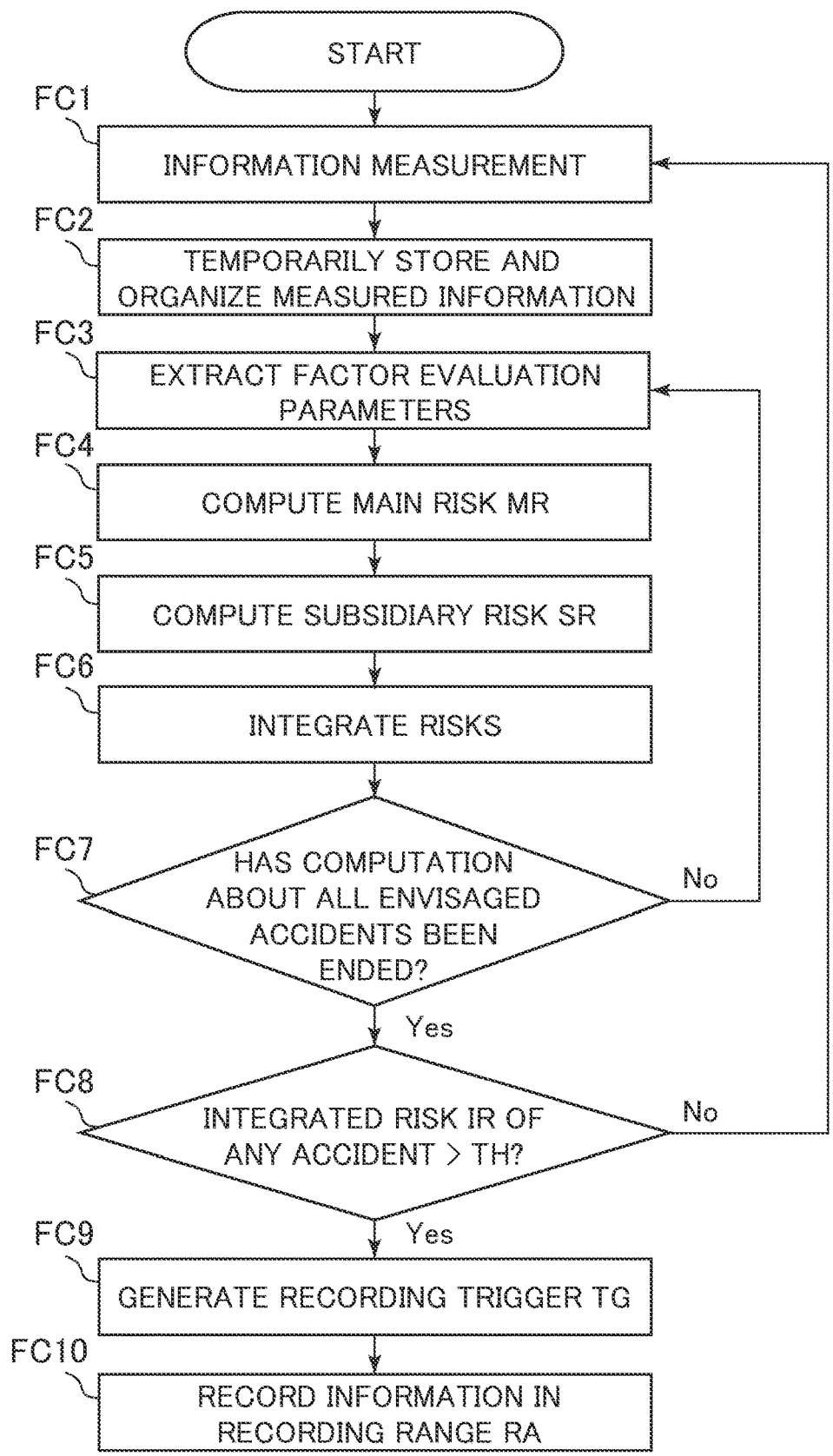
FIG. 13 is a diagram illustrating the processing flow of risk computation and recording according to the first embodiment.

FIG. 13 is a diagram illustrating the processing flow of risk computation and recording according to the first embodiment. FC1 is processing in which each of the measuring devices 6 to 8 measures information and transmits the measured information together with the measurement clock time to the risk management system 10. The measurement and transmission of information are asynchronously executed at cycles different for each of the measuring devices 6 to 8. FC2 is processing in which the temporary recording device 5a temporarily stores the pieces of information measured by each of the measuring devices 6 to 8 while organizing the time series. FC3 is processing in which the factor evaluation parameter extracting section 5b extracts parameters for evaluating factors of the respective accidents (factor evaluation parameters) from the pieces of information temporarily stored by the temporary recording device 5a. FC4 is processing in which the main risk computing section 5c calculates a main risk MR with use of a factor classified as the main factor by the factor evaluation parameter extracting section 5b as an input. FC5 is processing in which the subsidiary risk computing section 5d calculates a subsidiary risk SR with use of a factor classified as the subsidiary factor by the factor evaluation parameter extracting section 5b as an input. FC6 is processing in which the integrated risk computing section 5e calculates an integrated risk IR with use of the main risk MR computed by the main risk computing section 5c and the subsidiary risk SR computed by the subsidiary risk computing section 5d as inputs. FC7 is processing in which whether the integrated risks IR about all envisaged accidents have been calculated is determined. When the envisaged accident about which the integrated risk has not yet been calculated exists, a return to FC3 is made and computation of the integrated risk IR of the next envisaged accident is started. FC8 is processing in which the recording control section 5f determines whether to generate the recording start trigger TG with use of the integrated risk IR computed by the integrated risk computing section 5e as an input. FC9 is processing in which the recording trigger TG is generated when any integrated risk IR calculated about the envisaged accident exceeds the threshold TH. FC10 is processing in which the measured information in the recording range RA within a certain range from the clock time at which the recording trigger TG has been generated is extracted and is recorded in the recording device 11.

FIG. 14 is a diagram illustrating an effect that the evaluation accuracy of the risk of accidental contact improves. FIG. 14 (*a*) illustrates the situation in which the machine 2 is making swing action in the left direction under the existence of workers 3a, 3b, and 3c around the machine 2. Furthermore, it is assumed that the workers 3a and 3b are illuminated with illumination 15 existing in surroundings. Here, the risk is calculated with the weighting factor sa that is shown in expression (30) and decides the influence of the subsidiary risk SAR being set to 0.2.

FIG. 14 (*b*) illustrates the result of computation of the risk of the worker 3a. The worker 3a exists at a position very close to the bucket 26 of the machine 2 and exists in the swing action direction of the machine 2. Therefore, the main risk MAR is calculated to be high. On the other hand, the illumination 15 exists around the worker 3a and the worker 3a exists at a position easily visually recognized by the operator 13 who rides in the machine 2. Therefore, the subsidiary risk SAR of overlooking of the existence of the worker 3a by the operator 13 is calculated to be low. In the case of computing the integrated risk in the procedure shown in the present embodiment in such a situation, the influence of the main risk MAR calculated to be high is significantly considered and the integrated risk IAR is also calculated to be high. As one example of comparison, in the case of computing the risk in such a manner as to take the average of the main risk MAR and the subsidiary risk SAR differently from the procedure shown in the present embodiment, the average risk is calculated to be low due to the influence of the subsidiary risk SAR calculated to be low. This result does not correctly evaluate the situation in which the possibility of accidental contact is very high on the grounds of the distance from the worker 3 and the operation direction of the machine 2.

FIG. 14 (*c*) illustrates the result of computation of the risk of the worker 3b. The worker 3b does not exist in the operation direction of the machine 2 but exists at a position close to the upper swing structure 22 of the machine 2. Therefore, the main risk MAR is calculated to be middle. In addition, although the illumination 15 exists around the worker 3b, the worker 3b exists on the rear right side of the machine 2, which is difficult to visually recognize from the operator 13 who rides in the machine 2. Therefore, the subsidiary risk SAR is also calculated to be middle. In the case of computing the integrated risk IAR in the procedure shown in the present embodiment in such a situation, the influence of both the main risk MAR and the subsidiary risk SAR calculated to be middle is considered and the integrated risk IAR is calculated to be high. As one example of comparison, in the case of calculating the risk in such a manner as to take the average of the main risk MAR and the subsidiary risk SAR differently from the procedure shown in the present embodiment, the average risk is calculated to be middle due to the influence of the main risk MAR and the subsidiary risk SAR calculated to be middle. This result does not correctly evaluate the situation in which the main factor relating to the distance and the subsidiary factor relating to the blind area have an influence compositely.

FIG. 14 (*d*) illustrates the result of calculation of the risk of the worker 3c. The worker 3c exists at a far position outside the movable range of the front device 21 of the machine 2 and therefore the main risk MAR is calculated to be low. On the other hand, the illumination 15 does not exist around the worker 3c and the worker 3c exists on the rear side of the machine 2, which is difficult to visually recognize from the operator 13 who rides in the machine 2. Therefore, the subsidiary risk SAR is calculated to be high. In the case of calculating the integrated risk in the procedure shown in the present embodiment in such a situation, the influence of the main risk MAR calculated to be low is significantly considered and the integrated risk IAR is calculated to be low. As one example of comparison, in the case of calculating the risk in such a manner as to take the average of the main risk MAR and the subsidiary risk SAR differently from the procedure shown in the present embodiment, the influence of the subsidiary risk SAR calculated to be high is significantly considered and the risk is calculated to be excessively high. This result does not correctly evaluate the situation in which the distance between the machine 2 and the worker 3c is long and therefore the possibility of the occurrence of accidental contact is low.

FIG. 15 is a diagram illustrating an effect that the evaluation accuracy of the risk of an overturning accident improves. FIG. 15 (*a*) illustrates three types including a machine 2a that is working in the state in which the front device 21 in which a suspended load 16 is attached to the bucket 26 is extended under a favorable weather condition, a machine 2b that is working in the state in which the front device 21 is extended under a bad weather condition, and a machine 2c that is working in the state in which the front device 21 is contracted under a bad weather condition. Here, the risk is calculated with the weighting factor sa that is shown in expression (30) and decides the influence of the subsidiary risk SAR being set to 0.2.

FIG. 15 (b) illustrates the result of calculation of the risk of the machine 2a. The machine 2a is in an unbalanced state in which the front device 21 is extended, and is in the state in which the suspended load 16 is suspended. Therefore, the main risk MBR is calculated to be high. On the other hand, the weather condition in the work environment is favorable and the inclination of a slope is also not so large. Thus, the subsidiary risk SBR of a slip of the lower track structure 23 of the machine 2a is calculated to be low. In the case of calculating the integrated risk IBR in the procedure shown in the present embodiment in such a situation, the influence of the main risk MBR calculated to be high is significantly considered and the integrated risk IBR is also calculated to be high. As one example of comparison, in the case of calculating the risk in such a manner as to take the average of the main risk MBR and the subsidiary risk SBR differently from the procedure shown in the present embodiment, the average risk is calculated to be low due to the influence of the subsidiary risk SBR calculated to be low. This result does not correctly evaluate the situation in which the possibility of an overturning accident is very high on the grounds of the unstable posture and the load on the machine 2a.

FIG. 15c illustrates the result of calculation of the risk of the machine 2b. Although the machine 2b is in an unbalanced state in which the front device 21 is extended, a load is not applied to the bucket 26. Therefore, the main risk MBR is calculated to be middle. In addition, although the inclination of a slope is not so large, the weather condition in the work environment is bad and there is a possibility that the lower track structure 23 of the machine 2b slips and the machine 2b overturns. Thus, the subsidiary risk SBR is also calculated to be middle. In the case of calculating the integrated risk IBR in the procedure shown in the present embodiment in such a situation, the influence of both the main risk MBR and the subsidiary risk SBR calculated to be middle is considered and the integrated risk IBR is calculated to be high. As one example of comparison, in the case of calculating the risk in such a manner as to take the average of the main risk MBR and the subsidiary risk SBR differently from the procedure shown in the present embodiment, the average risk is calculated to be middle due to the influence of the main risk MBR and the subsidiary risk SBR calculated to be equivalent. This result does not correctly evaluate the situation in which the main factor relating to the posture of the machine 2b and the subsidiary factor relating to the weather condition have an influence compositely.

FIG. 15 (d) illustrates the result of calculation of the risk of the machine 2c. The machine 2c takes standby posture in the state in which the front device 21 is contracted. Therefore, the main risk MBR is calculated to be low. On the other hand, the weather condition in the work environment is bad and the inclination of a slope is large. Thus, there is a possibility that the lower track structure 23 of the machine 2c slips and overturns, and the subsidiary risk SBR is calculated to be high. In the case of calculating the integrated risk IBR in the procedure shown in the present embodiment in such a situation, the influence of the main risk MBR calculated to be low is significantly considered and the integrated risk IBR is calculated to be low. As one example of comparison, in the case of calculating the risk in such a manner as to take the average of the main risk MBR and the subsidiary risk SBR differently from the procedure shown in the present embodiment, the influence of the subsidiary risk SBR calculated to be high is significantly considered and the average risk is calculated to be excessively high. This result does not correctly evaluate the situation in which the machine 2c is working with stable posture and therefore the possibility of the occurrence of an overturning accident is low.

Figure 16:
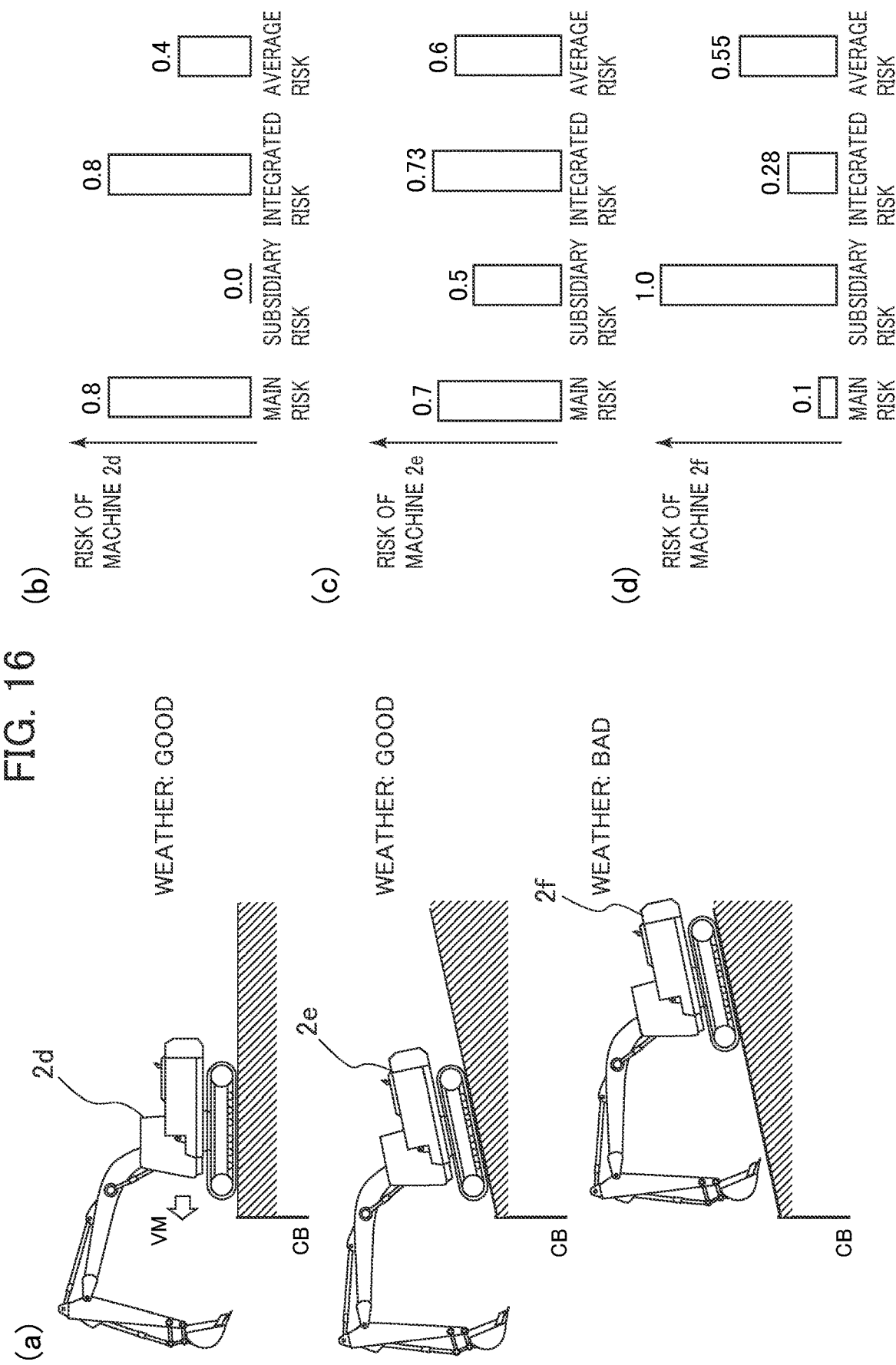
FIG. 16 is a diagram illustrating an effect that the evaluation accuracy of the risk of a fall accident improves according to the first embodiment.

FIG. 16 is a diagram illustrating an effect that the evaluation accuracy of the risk of a fall accident improves. FIG. 16 (a) illustrates three types including a machine 2d that is travelling at a low velocity in the cliff direction at a position close to the cliff CB, a machine 2e that is working at a position close to the cliff CB and on a slope, and a machine 2f that is working at a position far from the cliff CB although the weather condition is bad and the machine 2f exists on a slope. Here, the risk is calculated with the weighting factor sa that is shown in expression (30) and decides the influence of the subsidiary risk SAR being set to 0.2.

FIG. 16 (b) illustrates the result of calculation of the risk of the machine 2d. The machine 2d is travelling in the direction toward the cliff CB at a position close to the cliff CB. Therefore, the main risk MCR is calculated to be high. On the other hand, the machine 2d exists on a flat surface and the weather condition is favorable. Thus, the subsidiary risk SCR of a slip of the lower track structure 23 of the machine 2d is calculated to be low. In the case of calculating the integrated risk in the procedure shown in the present embodiment in such a situation, the influence of the main risk MCR calculated to be high is significantly considered and the integrated risk ICR is also calculated to be high. As one example of comparison, in the case of calculating the risk in such a manner as to take the average of the main risk MCR and the subsidiary risk SCR differently from the procedure shown in the present embodiment, the average risk is calculated to be low due to the influence of the subsidiary risk SCR calculated to be low. This result does not correctly evaluate the situation in which the possibility of a fall accident is very high on the grounds of the distance between the machine 2 and the cliff CB and the travelling direction.

FIG. 16 (c) illustrates the result of calculation of the risk of the machine 2e. The machine 2e is working in the stopped state although existing at a position close to the cliff CB. However, the main risk MCR is calculated to be middle. In addition, although the weather condition is favorable, the machine 2e is working on the slope and there is a possibility that the lower track structure 23 of the machine 2e slips and the machine 2e falls. Thus, the subsidiary risk SCR is also calculated to be middle. In the case of calculating the integrated risk ICR in the procedure shown in the present embodiment in such a situation, the influence of both the main risk MCR and the subsidiary risk SCR calculated to be middle is considered and the integrated risk ICR is calculated to be high. As one example of comparison, in the case of calculating the risk in such a manner as to take the average of the main risk and the subsidiary risk differently from the procedure shown in the present embodiment, the average risk is calculated to be middle due to the influence of the main risk and the subsidiary risk calculated to be equivalent. This result does not correctly evaluate the situation in which the main factor relating to the distance between the machine 2e and the cliff CB and the subsidiary factor relating to the slope have an influence compositely.

FIG. 16 (d) illustrates the result of calculation of the risk of the machine 2f. The machine 2f exists at a position far from the cliff CB and is working in the stopped state. Therefore, the main risk MCR is calculated to be low. On the other hand, the machine 2f is working on the slope in an environment in which the weather is bad and the possibility that the lower track structure 23 of the machine 2f slips and the machine 2f falls is high. Thus, the subsidiary risk SCR is calculated to be high. In the case of calculating the integrated risk ICR in the procedure shown in the present embodiment in such a situation, the influence of the main risk MCR calculated to be low is significantly considered and the integrated risk ICR is calculated to be low. As one example of comparison, in the case of calculating the risk in such a manner as to take the average of the main risk MCR and the subsidiary risk SCR differently from the procedure shown in the present embodiment, the influence of the subsidiary risk calculated to be high is significantly considered and the average risk is calculated to be excessively high. This result does not correctly evaluate the situation in which the machine 2f is working at the position far from the cliff CB and therefore the possibility of the occurrence of a fall accident is low.

As shown in the above risk calculation examples, the occurrence risk of a variety of accidents can be evaluated more accurately by effectively integrating the risks of the main factor and the subsidiary factor defined about each envisaged accident.

In the present embodiment, in the risk management system 10 including the measuring devices 6 to 8 that measure parameters that represent the state of the machine 2 and information on the surroundings of the machine 2, the controller 5 that calculates the occurrence risk of an accident in which the machine 2 is involved on the basis of the parameters measured by the measuring devices 6 to 8, and the recording device 11 capable of recording the parameters measured by the measuring devices 6 to 8, the controller 5 calculates the evaluation values of the main factor and the subsidiary factor of the accident on the basis of the parameters measured by the measuring devices 6 to 8, and calculates the main risk that is the degree at which the main factor contributes to the occurrence of the accident on the basis of the evaluation value of the main factor. Furthermore, the controller 5 calculates the subsidiary risk that is the degree at which the subsidiary factor contributes to the occurrence of the accident on the basis of the evaluation value of the subsidiary factor, and calculates, as the occurrence risk, the integrated risk IR that has a value equal to or larger than the main risk and increases or decreases at a degree lower than the degree of increase or decrease in the subsidiary risk. Moreover, when the integrated risk IR has exceeded the predetermined threshold TH, the controller 5 causes the recording device 11 to record parameters measured by the measuring devices 6 to 8 in a certain time period including the clock time at which the integrated risk IR has exceeded the predetermined threshold TH.

According to the present embodiment configured as above, the factors of the accident are classified into the main factor and the subsidiary factor, and the degree at which the main factor contributes to the occurrence of the accident (main risk MR) and the degree at which the subsidiary factor contributes to the occurrence of the accident (subsidiary risk SR) are calculated. Then, the occurrence risk (integrated risk IR) of the accident is calculated in the form in which the subsidiary risk SR is added on the main risk MR. This makes it possible to evaluate the occurrence risk of the accident in consideration of a variety of factors. Furthermore, the parameters measured when the integrated risk has become high are recorded in the recording device 11 and therefore the extraction accuracy of information necessary for analysis of the accident improves.

Moreover, the machine 2 in the present embodiment is a construction machine. An overturning accident of the construction machine is included in the accident and the weather condition in the surroundings of the machine 2 is included in the information on the surroundings of the machine 2. This makes it possible to evaluate the occurrence risk (integrated risk IR) of the accident also in consideration of a factor affected by the weather condition.

Moreover, the main factor is a factor that can be evaluated directly or analytically by parameters measured by the measuring devices 6 to 8 and the subsidiary factor is a factor that cannot be evaluated directly or analytically by parameters measured by the measuring devices 6 to 8. Due to this, the occurrence risk (integrated risk) of the accident is calculated in the form in which, on the risk of the factor that can be evaluated directly or analytically (main risk), the risk of the other factor (subsidiary risk) is added. Thus, the evaluation accuracy of the occurrence risk of the accident can be improved.

Second Embodiment

Figure 17:
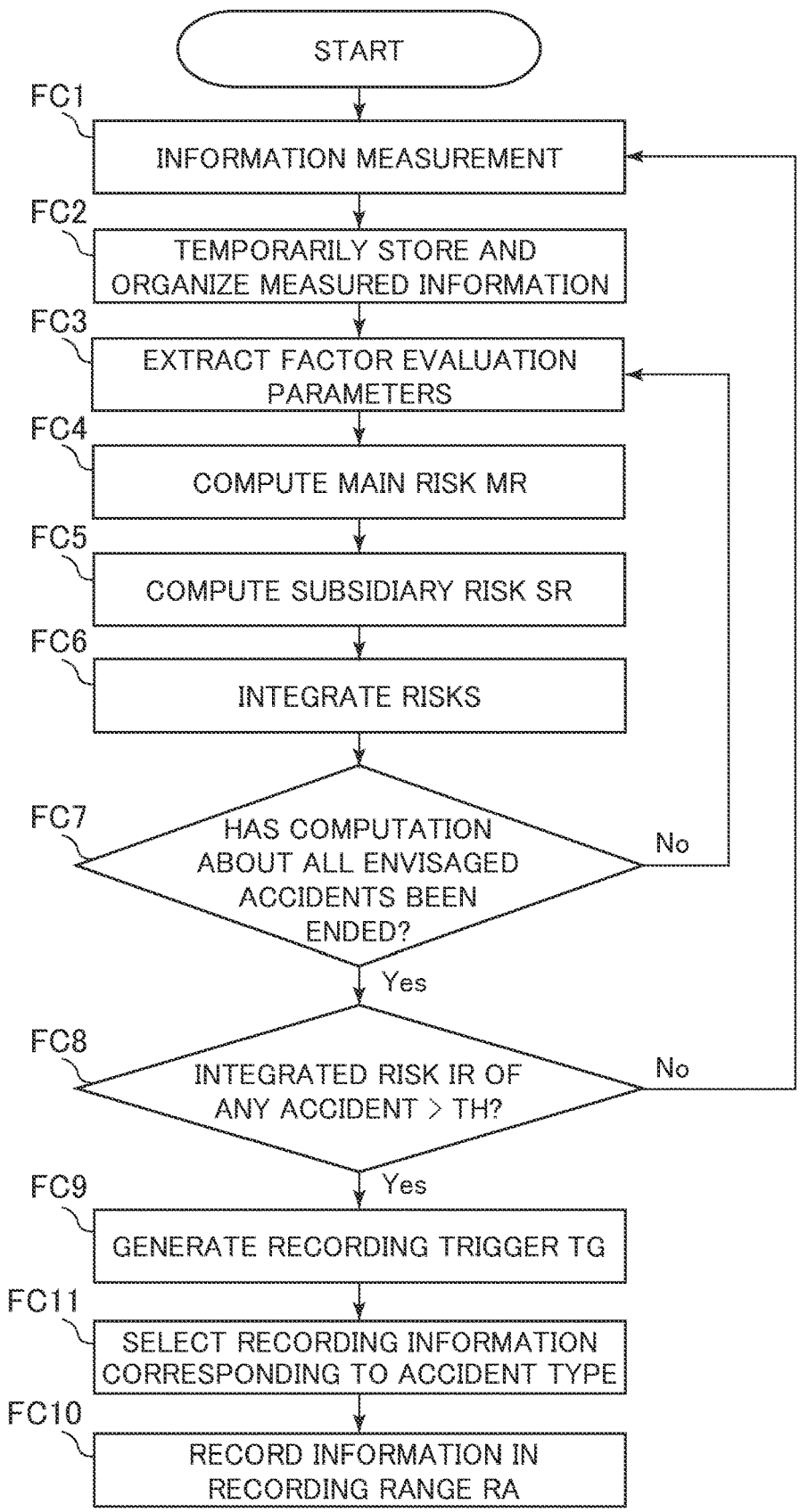
FIG. 17 is a diagram illustrating the processing flow of risk computation and recording according to a second embodiment.

FIG. 17 is a diagram illustrating the processing flow of risk calculation and recording according to a second embodiment. After the recording trigger TG is generated in FC9, in FC 11, the accident type about which the integrated risk IR has exceeded the threshold TH is checked by processing in the recording control section 5f and the recording information corresponding to the accident type about which the risk has become high is selected. Here, suppose that, for the recording information corresponding to each accident type, information with a high possibility of affecting the occurrence of the envisaged accident is selected in advance. After the corresponding recording information is selected, the recording range RA is decided and the measured information in the range RA is recorded in the recording device 11 in FC10.

Figure 18:
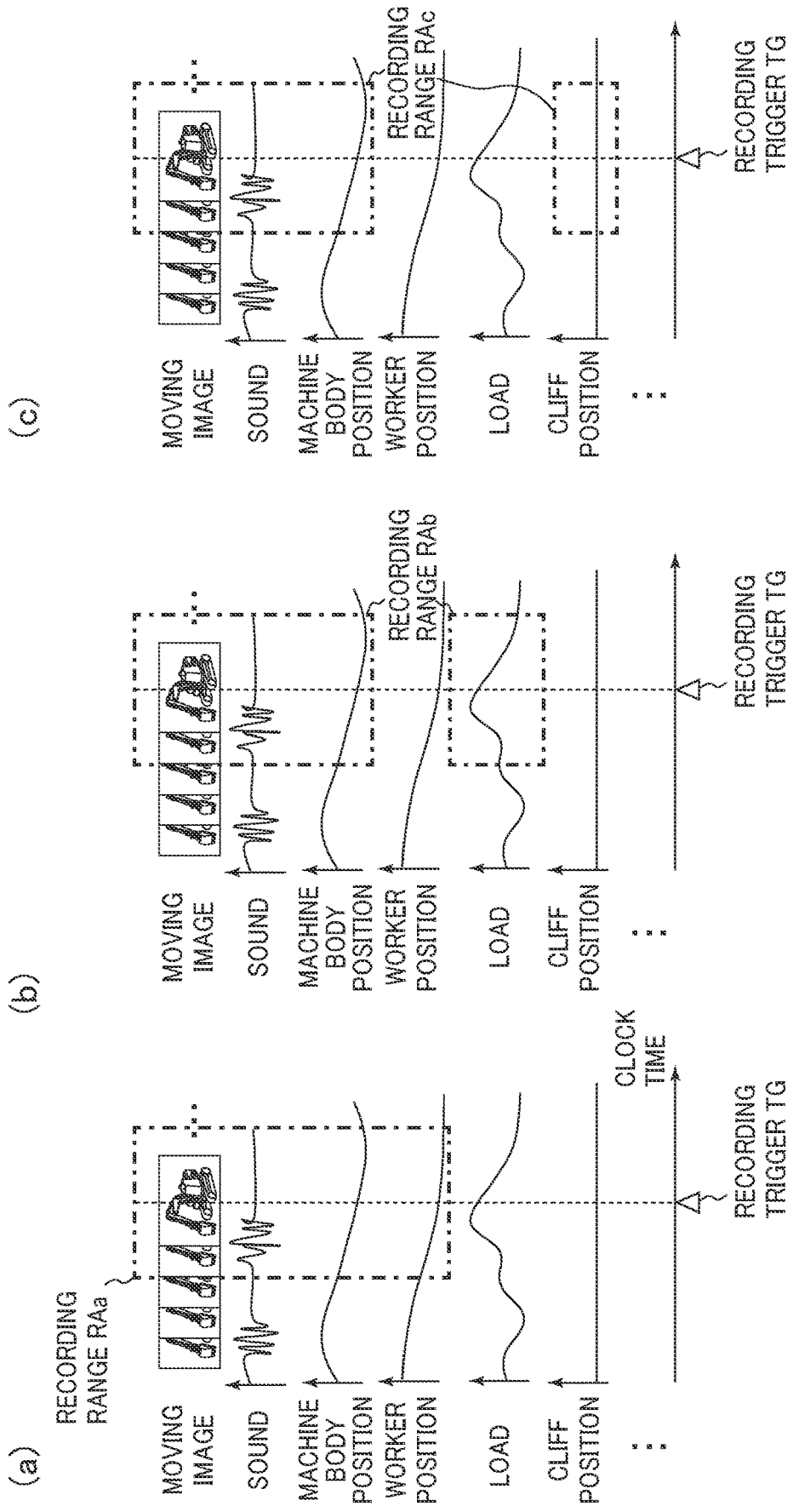
FIG. 18 is a diagram illustrating one example of the output result of the recording control section according to the second embodiment.

FIG. 18 is a diagram illustrating one example of the output result of the recording control section 5f. FIG. 18 (a) illustrates one example of the selection result of a recording range RAa when the integrated risk IAR relating to the accidental contact has become high. The recording range RAa includes position information of an obstacle that is a subject with which the machine 2 gets contact in addition to the normally necessary information such as moving image and sound around the work environment and the machine body position XM. In the present embodiment, the worker position WP is assumed as the obstacle information.

FIG. 18 (b) illustrates one example of the selection result of a recording range RAb when the integrated risk IBR relating to the overturning accident has become high. The recording range RAb includes load information that directly affects overturning of the machine 2 in addition to the normally necessary information such as moving image and sound around the work environment and the machine body position XM.

FIG. 18 (c) illustrates one example of the selection result of a recording range RAc when the integrated risk ICR relating to the fall accident has become high. The recording range RAc includes position information of the cliff CB from which the machine 2 is assumed to fall in addition to the normally necessary information such as moving image and sound around the work environment and the machine body position XM.

When the occurrence risk (integrated risk IR) of an accident has exceeded the predetermined threshold TH, the controller 5 in the present embodiment causes the recording device 11 to record information representing the type of the accident and parameters (factor evaluation parameters) used for calculation of the evaluation value of the main factor or the subsidiary factor that have been measured by the measuring devices 6 to 8 in a certain time period including the clock time at which the occurrence risk has exceeded the predetermined threshold TH.

According to the present embodiment configured as above, by making a choice of the recording information according to the accident type with a high possibility of the occurrence, the amount of information recorded in the recording device 11 can be effectively reduced while lack of the recording information having a relation with the accident is suppressed to the minimum.

Third Embodiment

Figure 19:
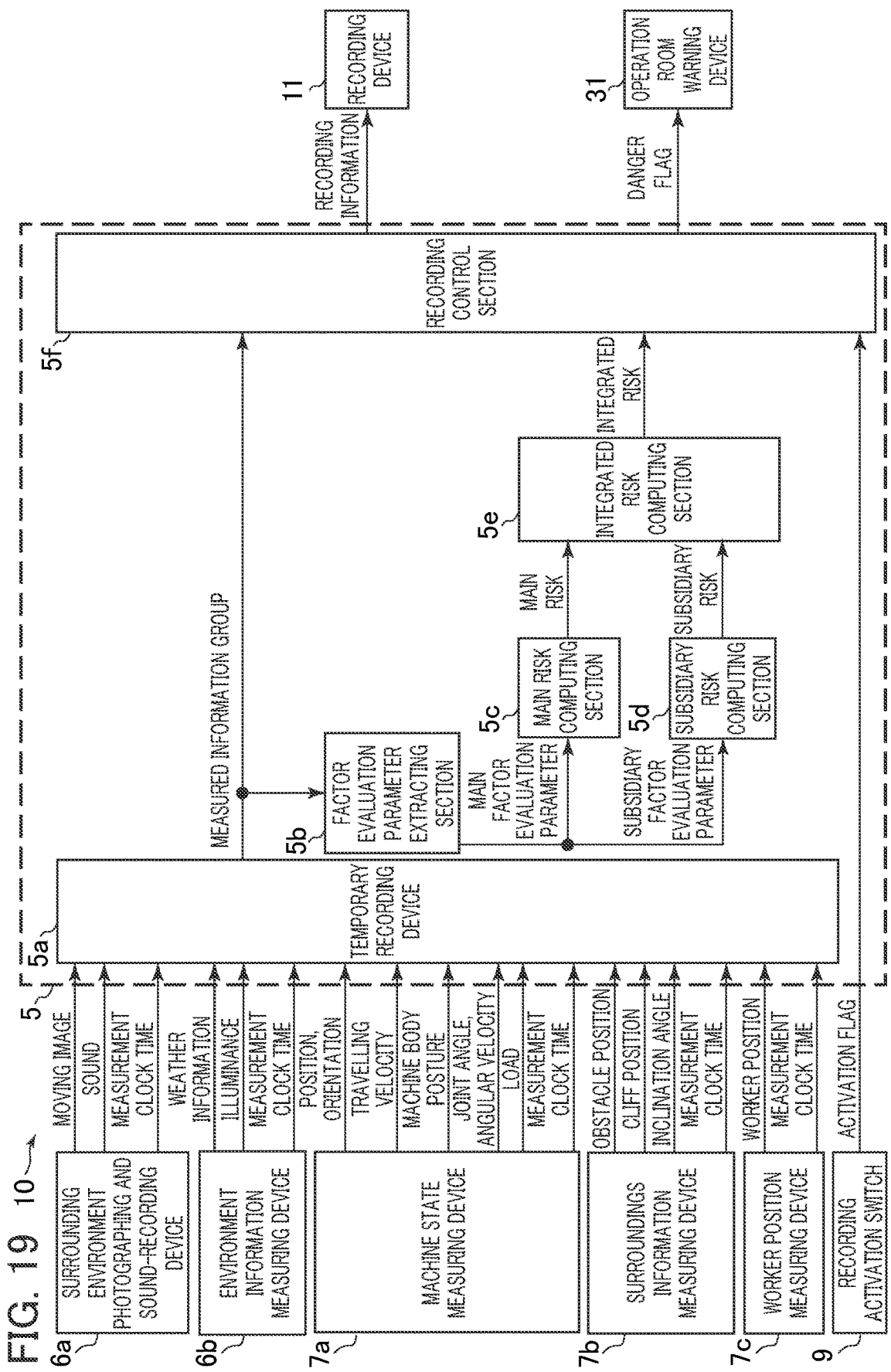
FIG. 19 is a functional block diagram illustrating processing functions of the risk management system according to a third embodiment.

FIG. 19 is a functional block diagram illustrating processing functions of the risk management system 10 according to a third embodiment of the present invention. The recording control section 5f records recording information in the recording device 11 when the integrated risk IR has exceeded the threshold TH and outputs a danger flag to an operation room warning device 31 with which the machine 2 is equipped. The operation room warning device 31 issues a warning to the operator 13 who rides in the operation room 27 when the danger flag is inputted thereto.

Figure 20:
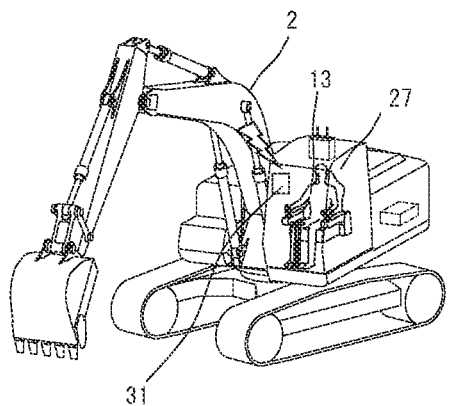
FIG. 20 is a diagram illustrating a mounting image of an operation room warning device according to the third embodiment.

FIG. 20 is a diagram illustrating a mounting image of the operation room warning device 31. Sound output equipment installed in the operation room 27 is employed as the operation room warning device 31. The operation room warning device 31 is not limited to the sound output equipment and may be configured to cause lighting of an indicating lamp or output an image by a monitor or the like. Furthermore, the operation room warning device 31 may be configured to be mounted directly on the operator 13 who rides in the operation room 27. Regarding transmission of a danger flag signal to the operation room warning device 31, a system in which the server computer 5 equipped with the risk management system 10 is mounted in the machine 2 and the server computer 5 and the operation room warning device 31 are electrically connected to each other, and a system in which the transmission is executed via a network provided by the communication facility 4 are conceivable.

The risk management system 10 according to the present embodiment includes the operation room warning device 31 that is mounted in the operation room 27 of the machine 2 and outputs a warning in response to an instruction from the controller 5, and the controller instructs the operation room warning device 31 to output the warning when the occurrence risk (integrated risk IR) of an accident has exceeded the predetermined threshold TH.

According to the present embodiment configured as above, information when the risk of the occurrence of an accident has become high can be recorded. In addition, a further rise in the occurrence risk of the accident can be suppressed by prompting the operator 13 to stop operation continuation of the machine 2 at the time of the high risk.

Fourth Embodiment

Figure 21:
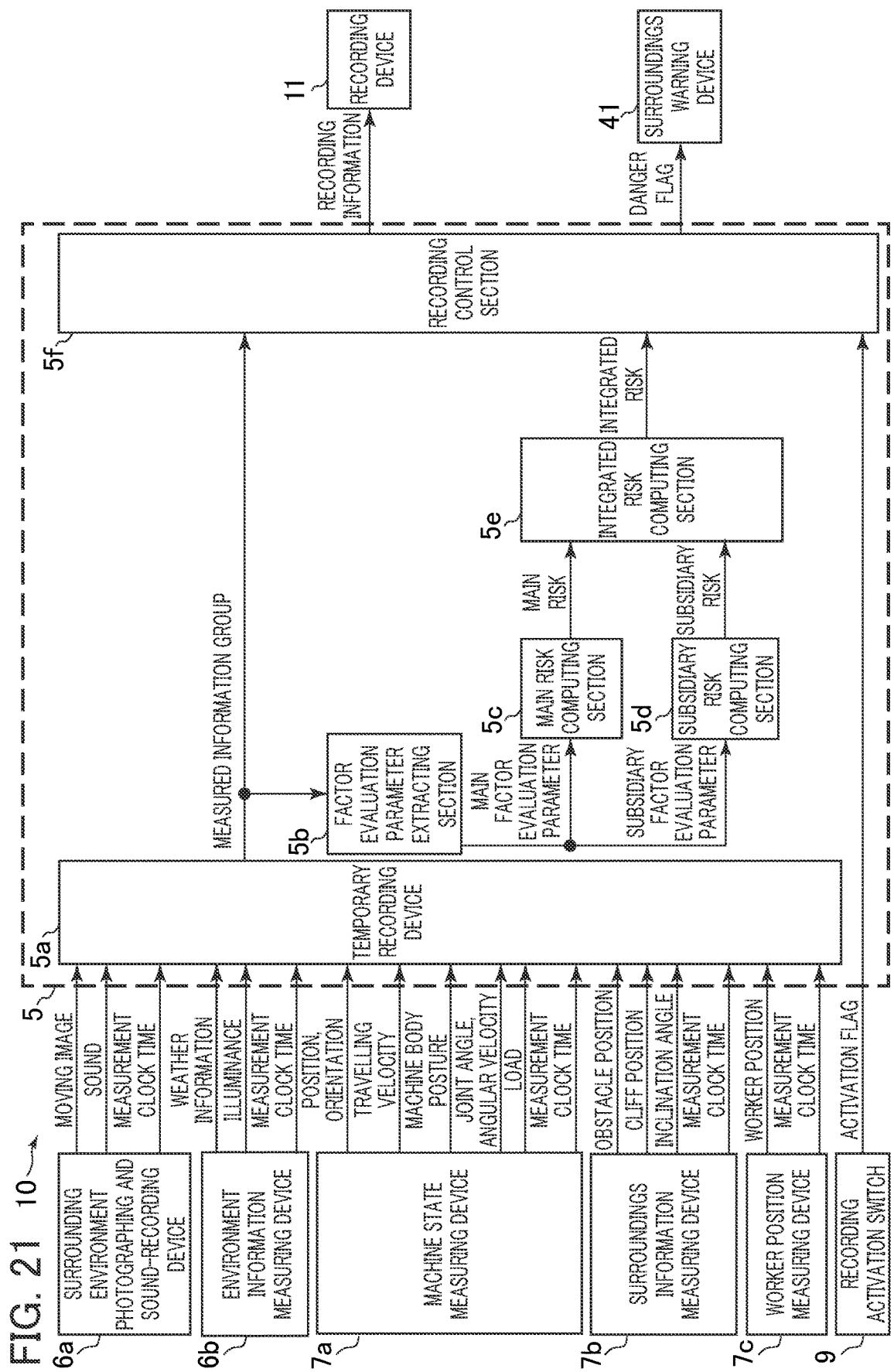
FIG. 21 is a functional block diagram illustrating processing functions of the risk management system according to a fourth embodiment.

FIG. 21 is a functional block diagram illustrating processing functions of the risk management system 10 according to a fourth embodiment. The recording control section 5f records recording information in the recording device 11 when the integrated risk IR has exceeded the threshold TH and outputs a danger flag to a surroundings warning device 41 installed on the machine 2 or the worker 3 or in the surrounding environment. The surroundings warning device 41 issues a warning to the worker 3 who exists around the machine 2 when the danger flag is inputted thereto.

Figure 22:
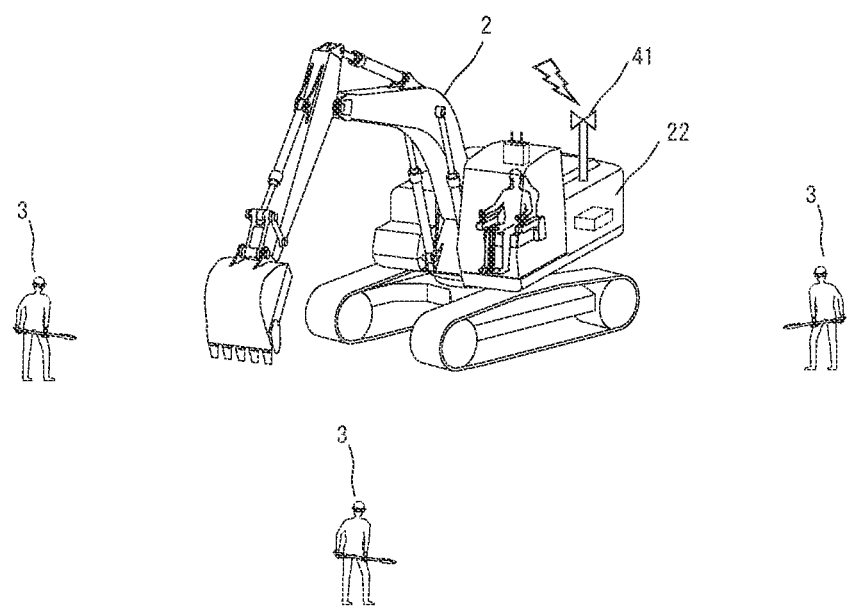
FIG. 22 is a diagram illustrating a mounting image of a surroundings warning device according to the fourth embodiment.

FIG. 22 is a diagram illustrating a mounting image of the surroundings warning device 41. In the present embodiment, sound output equipment installed on the upper swing structure 22 is employed as the surroundings warning device 41. The surroundings warning device 41 is not limited to the sound output equipment and may be configured to cause lighting of an indicating lamp or output an image by a monitor or the like. Furthermore, the surroundings warning device 41 may be such a system as to be mounted directly on the worker 3 who exists in the surroundings or may be configured to be installed on a pole or the like fixed in a construction site. Regarding transmission of a danger flag signal to the surroundings warning device 41, a system in which the server computer 5 is mounted in the machine 2 and the server computer 5 and the surroundings warning device 41 are electrically connected to each other and a system in which the transmission is executed via a network provided by the communication facility 4 are conceivable.

The risk management system 10 according to the present embodiment includes the surroundings warning device 41 that is mounted on the machine 2 and is capable of outputting a warning in response to an instruction from the controller 5, and the controller 5 instructs the surroundings warning device 41 to output the warning when the occurrence risk (integrated risk IR) of an accident has exceeded the predetermined threshold TH.

According to the present embodiment configured as above, information when the risk of the occurrence of an accident has become high can be recorded. In addition, it becomes possible to prevent the occurrence of a secondary disaster such as involvement of the worker 3 who exists around the machine 2 in the accident.

The embodiments of the present invention have been described in detail above. However, the present invention is not limited to the above-described embodiments and various modification examples are included. For example, the above-described embodiments are what are described in detail in order to explain the present invention in an easy-to-understand manner and are not necessarily limited to what include all configurations described. Furthermore, it is also possible to add part of a configuration of a certain embodiment to a configuration of another embodiment, and it is also possible to delete part of a configuration of a certain embodiment or replace part of a configuration of a certain embodiment by part of another embodiment.

DESCRIPTION OF REFERENCE CHARACTERS

1: Construction system
2, 2a to 2f: Machine
3, 3a to 3c: Worker
4: Communication facility
5: Server computer (controller)
5a: Temporary recording device
5b: Factor evaluation parameter extracting section
5c: Main risk computing section
5c1, 5c2: Factor evaluating section
5c3, 5c4: Risk computing section
5c9, 5c10: Factor evaluating section
5c11, 5c12: Risk computing section
5d: Subsidiary risk computing section
5d1: Factor evaluating section
5d2: Risk computing section
5d3: Factor evaluating section
5d4: Risk computing section 5*d*5: Factor evaluating section
5*d*6: Risk computing section
5*e*: Integrated risk computing section
5*e*1: Main risk integrating section
5*e*2: Subsidiary risk integrating section
5*e*3: Risk integrating section
6: Environment-installed sensor (measuring device)
7: Machine-installed sensor (measuring device)
7*a*: Machine state measuring device
7*a*1, 7*a*2: GNSS antenna
7*a*3: Inertial measurement unit
7*a*4: Rotation angle measuring unit
7*a*5 to 7*a*7: Inertial measurement unit
7*a*8: Pressure measuring device group
7*b*: Surroundings information measuring device
7*b*1: Laser sensor
8: Worker-installed sensor (measuring device)
9: Recording activation switch
10: Risk management system
11: Recording device
13: Operator
15: Illumination
16: Suspended load
21: Front device
22: Upper swing structure
23: Lower track structure
24: Boom
25: Arm
26: Bucket
27: Operation room
28: Control valve
31: Operation room warning device
41: Surroundings warning device

The invention claimed is:

1. A risk management system including
measuring devices that measure parameters that represent a state of a machine and information on surroundings of the machine,
a controller that calculates an occurrence risk of an accident in which the machine is involved on a basis of the parameters measured by the measuring devices, and
a recording device capable of recording the parameters measured by the measuring devices, wherein
the controller is configured to
calculate evaluation values of a main factor and a subsidiary factor of the accident on a basis of the parameters measured by the measuring devices,
calculate a main risk that is a degree at which the main factor contributes to occurrence of the accident on a basis of an evaluation value of the main factor,
calculate a subsidiary risk that is a degree at which the subsidiary factor contributes to occurrence of the accident on a basis of an evaluation value of the subsidiary factor,
calculate, as the occurrence risk, an integrated risk that has a value equal to or larger than the main risk and increases or decreases at a degree lower than a degree of increase or decrease in the subsidiary risk, and
in a case where the integrated risk has exceeded a predetermined threshold, cause the recording device to record parameters measured by the measuring devices in a certain time period including a clock time at which the integrated risk has exceeded the predetermined threshold.

2. The risk management system according to claim 1, wherein
the controller is configured to, in a case where the integrated risk has exceeded the predetermined threshold, cause the recording device to record information representing a type of the accident and parameters used for calculation of the evaluation value of the main factor or the subsidiary factor, the information and the parameters having been measured by the measuring devices in a certain time period including a clock time at which the integrated risk has exceeded the predetermined threshold.

3. The risk management system according to claim 1, wherein
the risk management system includes an operation room warning device that is mounted in an operation room of the machine and outputs a warning in response to an instruction from the controller, and
the controller instructs the operation room warning device to output the warning in a case where the integrated risk has exceeded the predetermined threshold.

4. The risk management system according to claim 1, wherein
the risk management system includes a surroundings warning device that is mounted on the machine and is capable of outputting a warning in response to an instruction from the controller, and
the controller instructs the surroundings warning device to output the warning in a case where the integrated risk has exceeded the predetermined threshold.

5. The risk management system according to claim 1, wherein
the main factor is a factor can be evaluated directly or analytically by parameters measured by the measuring devices, and
the subsidiary factor is a factor that cannot be evaluated directly or analytically by parameters measured by the measuring devices.

6. The risk management system according to claim 1, wherein
the machine is a construction machine,
an overturning accident of the construction machine is included in the accident, and
a weather condition in the surroundings of the machine is included in the information on the surroundings of the machine.

7. The risk management system according to claim 1, wherein
the controller is configured to, on a basis of a type of the accident, a factor involved in occurrence of the accident, a factor evaluation parameter that is part of the parameters measured by the measuring devices and is for evaluating the factor, and classification of whether the factor is the main factor or the subsidiary factor, calculate the evaluation value of the main factor by using the factor evaluation parameter corresponding to the factor in a case where the factor is classified as the main factor, and calculate the evaluation value of the subsidiary factor by using the factor evaluation parameter corresponding to the factor in a case where the factor is classified as the subsidiary factor.

* * * * *